(12) United States Patent
Kern et al.

(10) Patent No.: US 9,578,937 B2
(45) Date of Patent: Feb. 28, 2017

(54) REUSABLE BAG

(75) Inventors: Elizabeth C. Kern, Minneapolis, MN (US); Jason V. Drew, Minneapolis, MN (US); Michael M. Habig, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 831 days.

(21) Appl. No.: 13/611,452

(22) Filed: Sep. 12, 2012

(65) Prior Publication Data

US 2013/0156351 A1    Jun. 20, 2013

Related U.S. Application Data

(60) Provisional application No. 61/577,985, filed on Dec. 20, 2011.

(51) Int. Cl.
*A45C 3/04* (2006.01)
*B65D 30/08* (2006.01)
*B65D 33/12* (2006.01)

(52) U.S. Cl.
CPC ............. *A45C 3/04* (2013.01); *B65D 31/04* (2013.01); *B65D 33/12* (2013.01); *Y02W 30/807* (2015.05)

(58) Field of Classification Search
CPC ......... A45C 7/0077; A45C 13/02; A45C 3/00; A45C 3/04; A45F 3/04; B65D 31/12; B65D 31/04; B65D 33/12; Y02W 30/807
USPC .......................................... 383/6, 24, 38, 39
See application file for complete search history.

(56) References Cited

U.S. PATENT DOCUMENTS

| | | | | |
|---|---|---|---|---|
| 2,654,527 | A | * 10/1953 | Geckler et al. | 383/40 |
| 3,963,102 | A | 6/1976 | Carp | |
| 4,011,898 | A | * 3/1977 | Hubbard | 150/107 |
| 4,062,392 | A | 12/1977 | Ishii | |
| 4,085,873 | A | * 4/1978 | Schweitzer | 294/142 |
| 4,148,347 | A | 4/1979 | Seaman | |
| D280,043 | S | 8/1985 | Allen | |
| 4,685,570 | A | * 8/1987 | Medow | 206/579 |
| 4,979,833 | A | 12/1990 | Cook | |
| 5,046,860 | A | 9/1991 | Brennan | |
| 5,090,526 | A | * 2/1992 | Jacober | 190/107 |
| 5,149,202 | A | * 9/1992 | Dickert | 383/106 |
| 5,152,612 | A | 10/1992 | Shoemaker | |
| D332,740 | S | 1/1993 | Robbins | |
| 5,251,743 | A | 10/1993 | Pulido et al. | |
| D341,486 | S | 11/1993 | Frank | |

(Continued)

OTHER PUBLICATIONS

Office Action from Canadian Patent Application No. 2,790,127, mailed May 28, 2013 (3 pages).

(Continued)

*Primary Examiner* — Peter Helvey
(74) *Attorney, Agent, or Firm* — Leanne Taveggia Farrell; Westman, Champlin & Koehler, P.A.

(57) ABSTRACT

A bag includes an interior pocket and an exterior pocket. The interior pocket is attached to a wall of the bag along a seam that is stitched across a width of the wall. The seam is located at a height from a bottom of the wall. The exterior pocket is attached to the bottom of the wall of the bag and has a top edge extending across the width of the wall. The top edge of the exterior pocket is located a height from the bottom of the wall. The height of the top edge of the exterior pocket is greater than the height of the seam of the interior pocket.

19 Claims, 19 Drawing Sheets

(56) References Cited

U.S. PATENT DOCUMENTS

| | | | |
|---|---|---|---|
| 5,288,150 A | 2/1994 | Bearman | |
| 5,289,906 A * | 3/1994 | Guidi | 190/107 |
| 5,399,020 A * | 3/1995 | Cheng | 383/4 |
| 5,490,619 A * | 2/1996 | Boyar | 224/153 |
| 5,577,652 A * | 11/1996 | Cooper | 224/578 |
| 5,630,544 A * | 5/1997 | Shane | 229/117.06 |
| 5,797,491 A * | 8/1998 | Fierek et al. | 206/373 |
| 5,797,529 A * | 8/1998 | Lavine | 224/575 |
| 5,813,445 A * | 9/1998 | Christman | A63F 3/06 150/106 |
| 5,851,069 A * | 12/1998 | Davoren | 383/38 |
| D413,723 S | 9/1999 | Quansah | |
| 6,071,010 A | 6/2000 | Chan | |
| 6,231,233 B1 * | 5/2001 | Orce | 383/38 |
| 6,478,463 B2 * | 11/2002 | Snider | A45C 13/02 206/373 |
| D506,060 S | 6/2005 | Achilles | |
| 7,160,028 B1 | 1/2007 | Linday | |
| 7,334,684 B1 * | 2/2008 | Fontanilla et al. | 206/541 |
| D608,089 S | 1/2010 | McCoy et al. | |
| D623,406 S | 9/2010 | Yu | |
| D623,853 S | 9/2010 | Yu | |
| D630,013 S | 1/2011 | Yu | |
| 7,958,920 B1 | 6/2011 | Olsson | |
| 8,011,500 B2 | 9/2011 | Lee | |
| 2002/0181806 A1 * | 12/2002 | Godshaw et al. | 383/6 |
| 2005/0028910 A1 | 2/2005 | Duty | |
| 2006/0291753 A1 * | 12/2006 | Godshaw et al. | 383/4 |
| 2007/0151895 A1 * | 7/2007 | Patterson | 206/581 |
| 2009/0080808 A1 | 3/2009 | Hagen | |
| 2009/0101253 A1 | 4/2009 | Kinskey et al. | |
| 2009/0290816 A1 | 11/2009 | Nathan et al. | |
| 2010/0008604 A1 | 1/2010 | McIver | |
| 2010/0014785 A1 | 1/2010 | Deck | |
| 2010/0021088 A1 | 1/2010 | Wilfong, Jr. | |
| 2010/0084443 A1 | 4/2010 | Adelman | |
| 2010/0086237 A1 * | 4/2010 | Diepen | 383/12 |
| 2010/0092110 A1 * | 4/2010 | Simhony et al. | 383/13 |
| 2010/0104223 A1 | 4/2010 | Hickey et al. | |
| 2010/0104224 A1 | 4/2010 | Hickey et al. | |
| 2010/0158414 A1 | 6/2010 | Michailidis | |
| 2010/0200450 A1 | 8/2010 | Weed | |
| 2010/0316308 A1 | 12/2010 | Heinlen et al. | |
| 2011/0142373 A1 | 6/2011 | Kong | |
| 2011/0168720 A1 | 7/2011 | Mesman | |

OTHER PUBLICATIONS

Office Action from Canadian Patent Application No. 2,790,127, mailed Jan. 20, 2014 (2 pages).

Office Action from Canadian Patent Application No. 2,790,127, mailed Oct. 1, 2013 (3 pages).

* cited by examiner

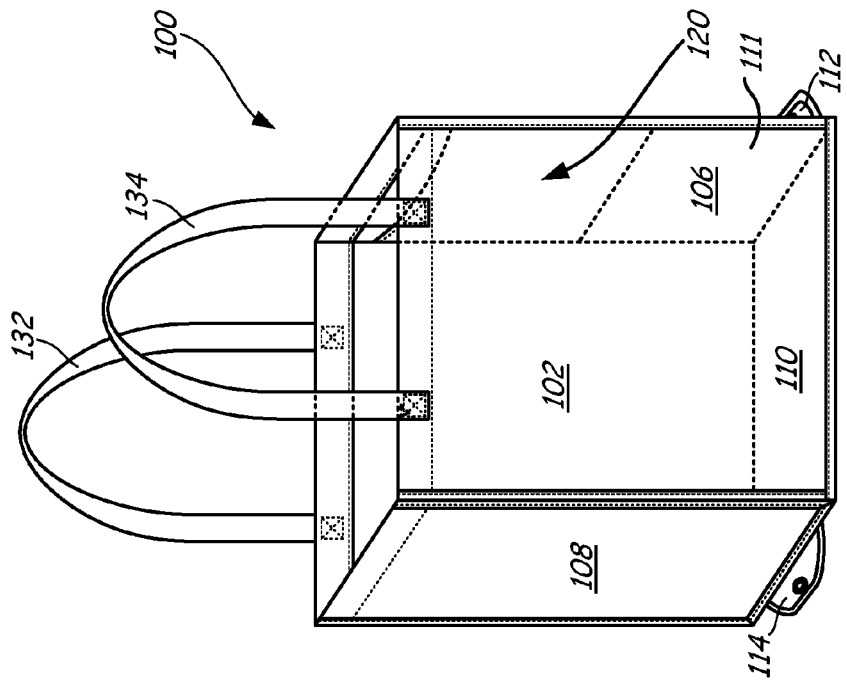
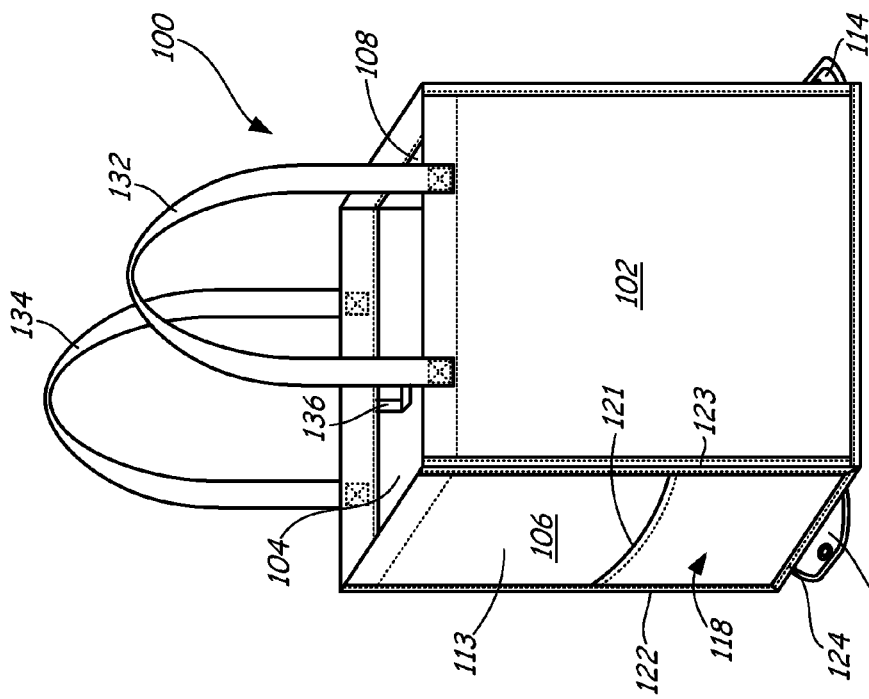
Fig. 1B
Fig. 1A

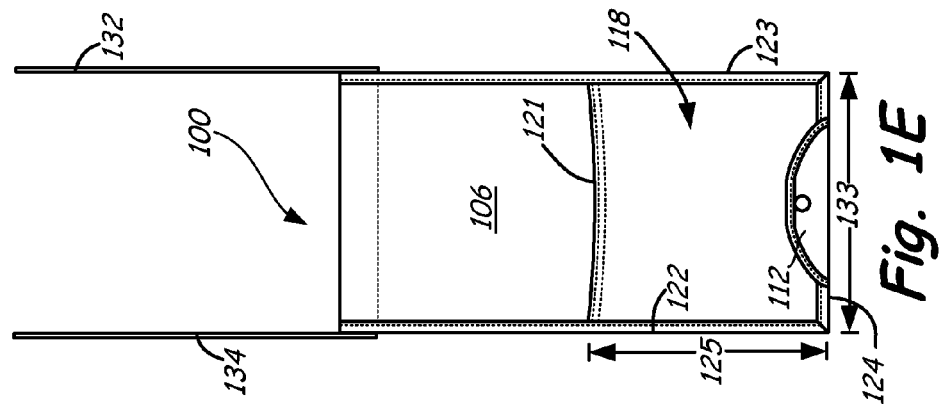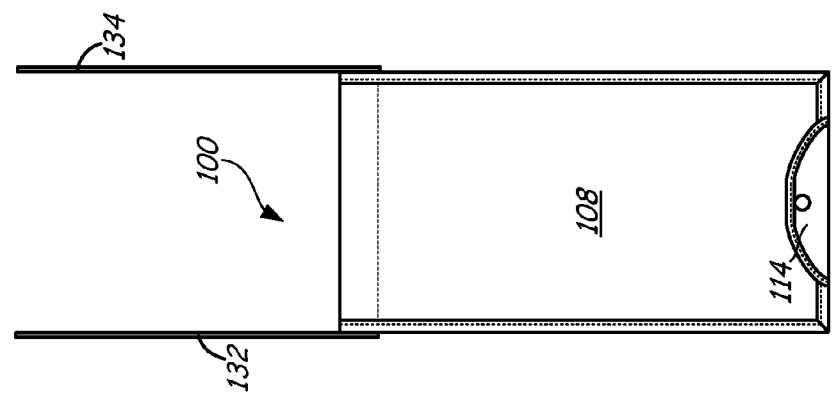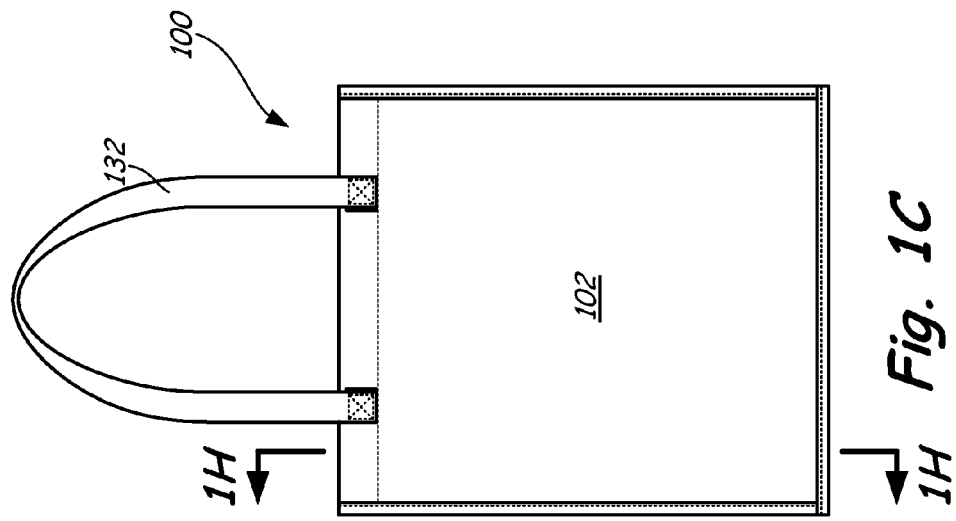

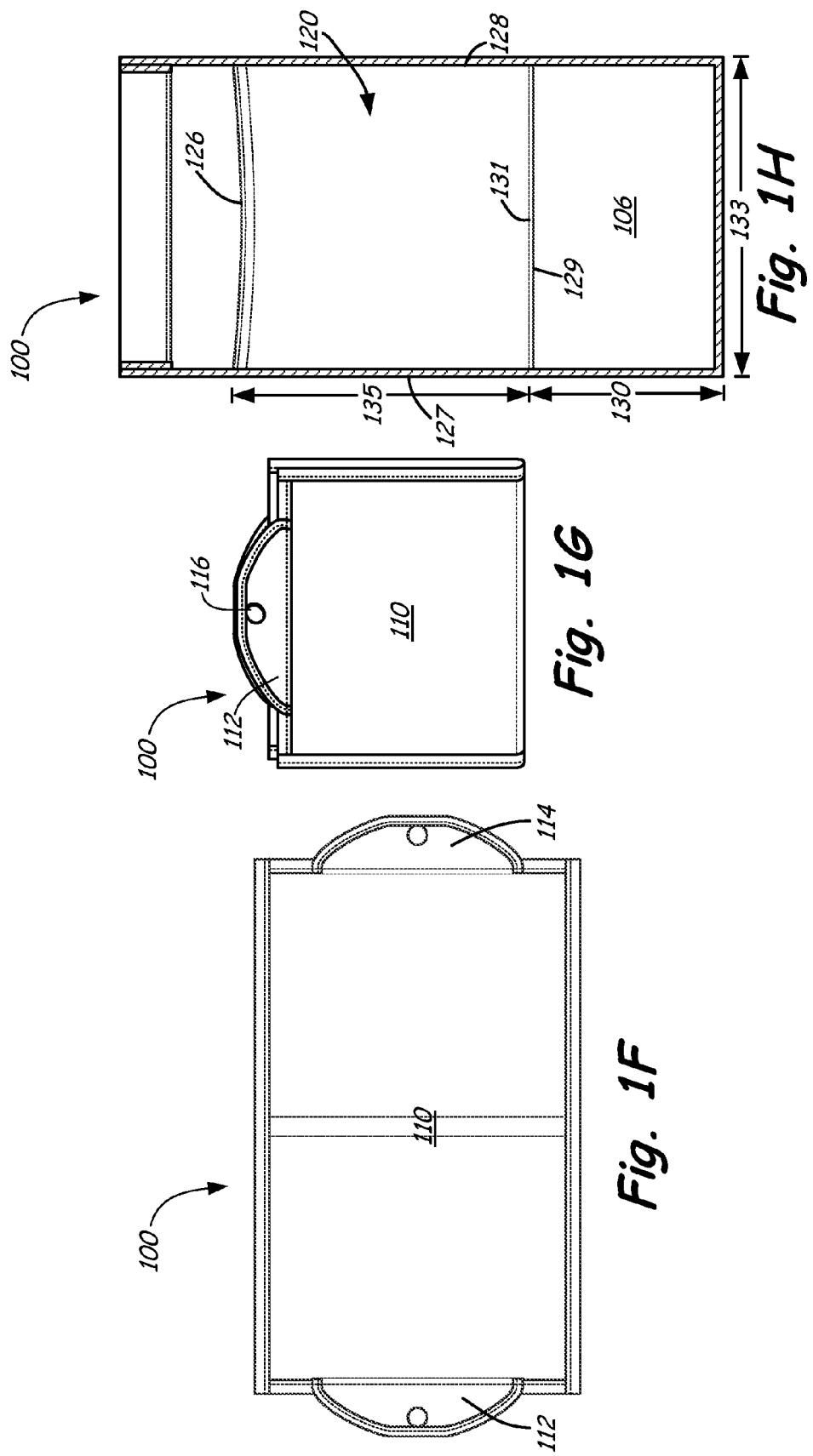

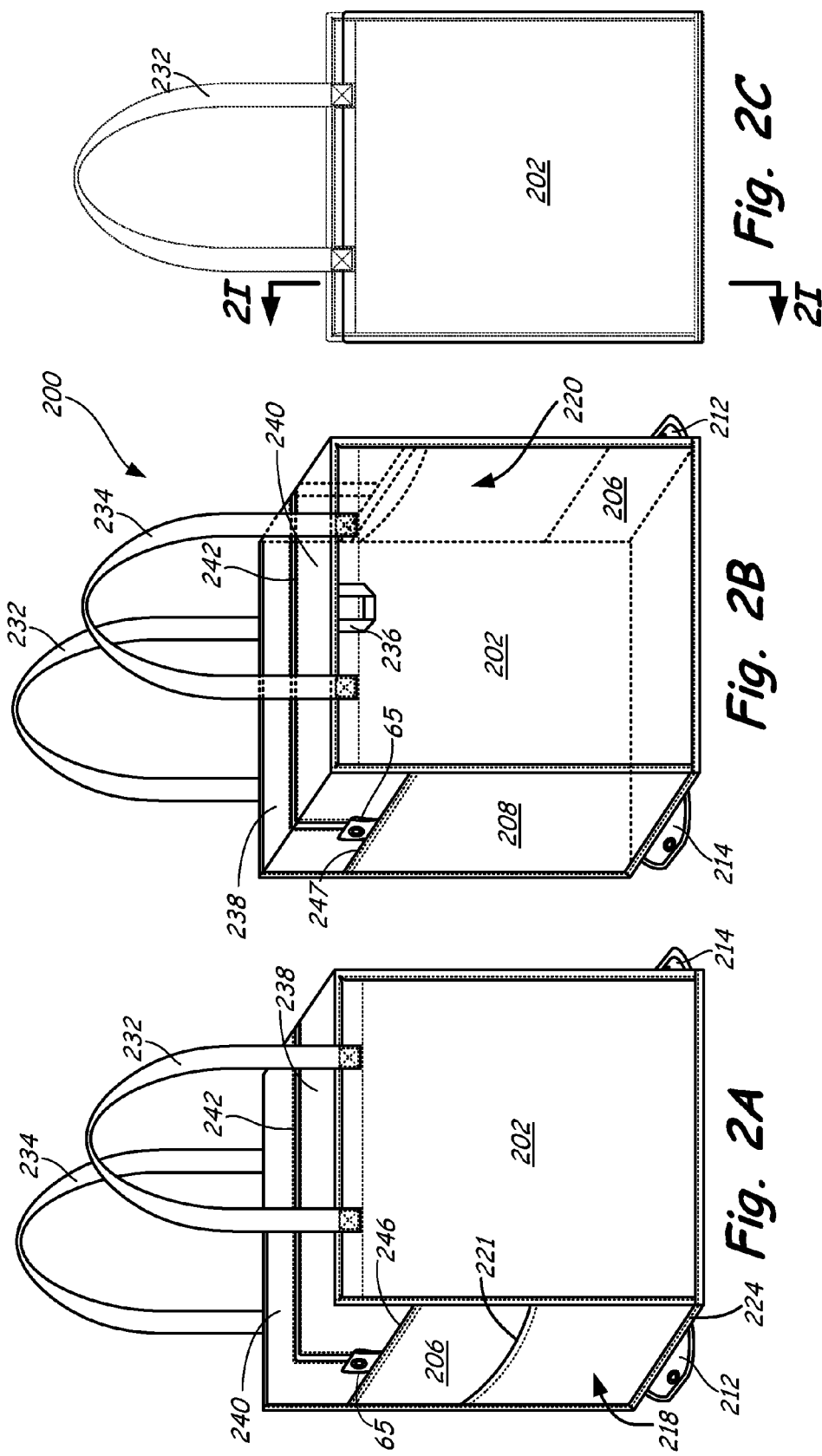

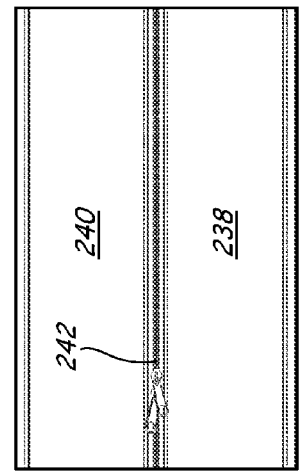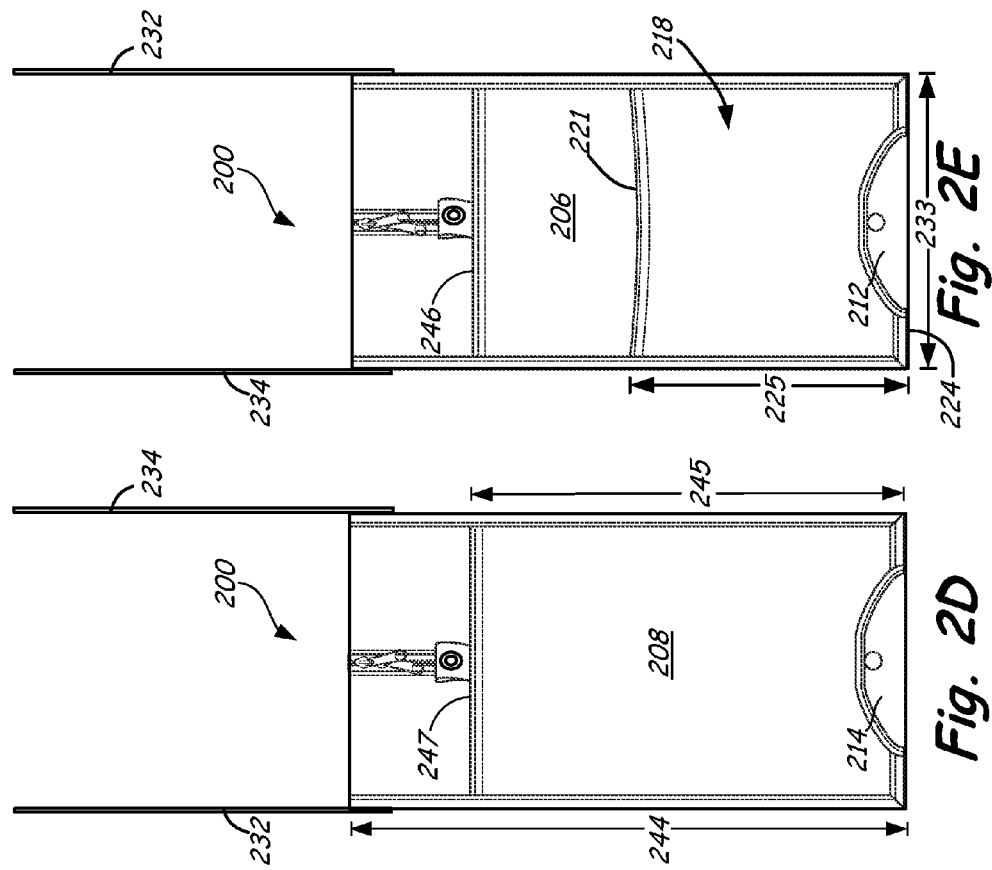

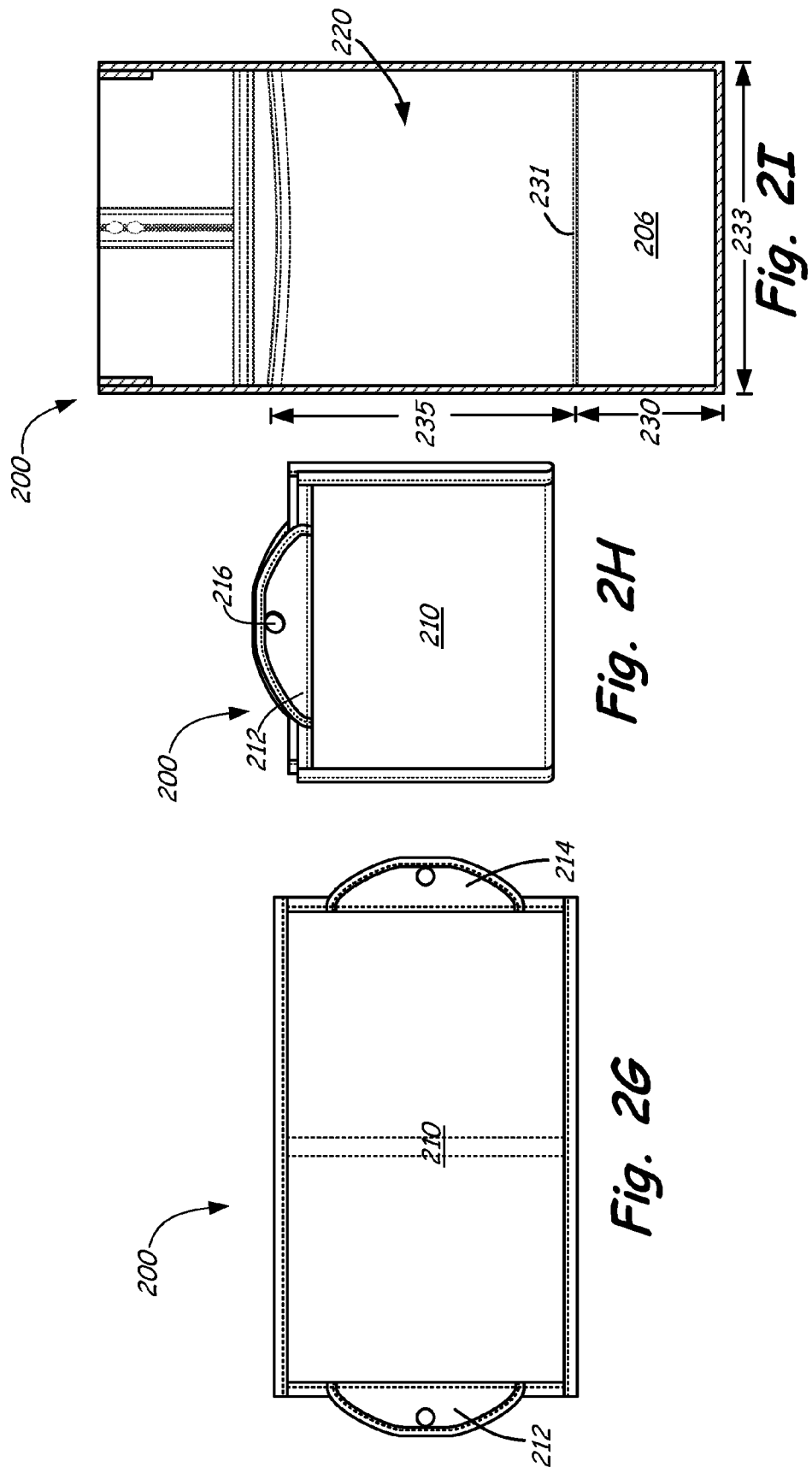

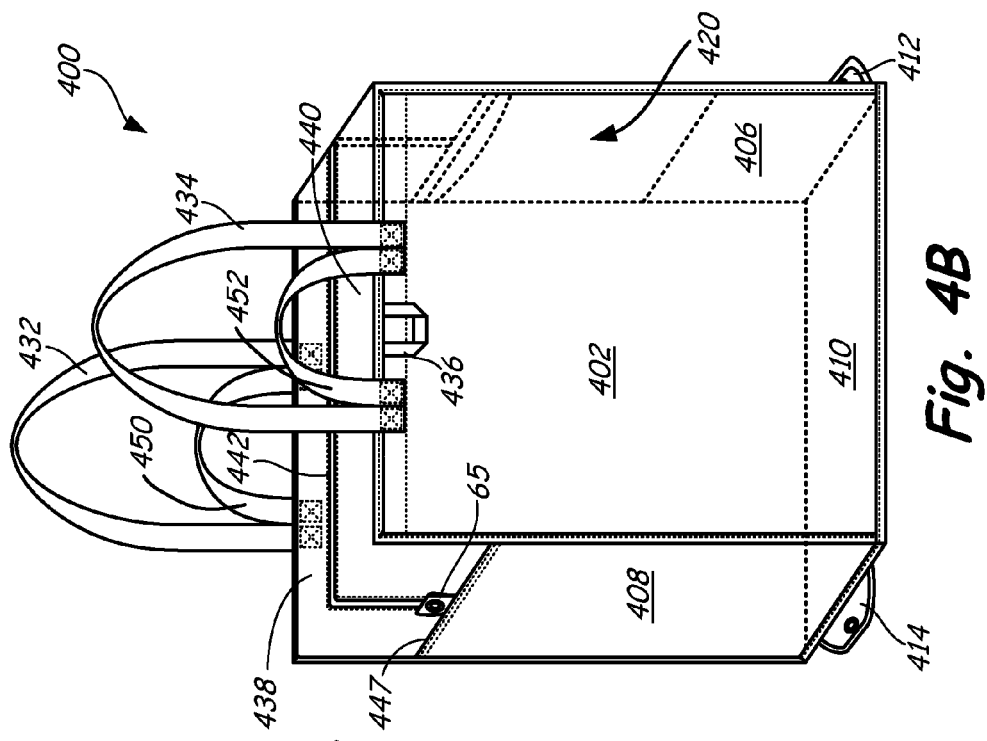
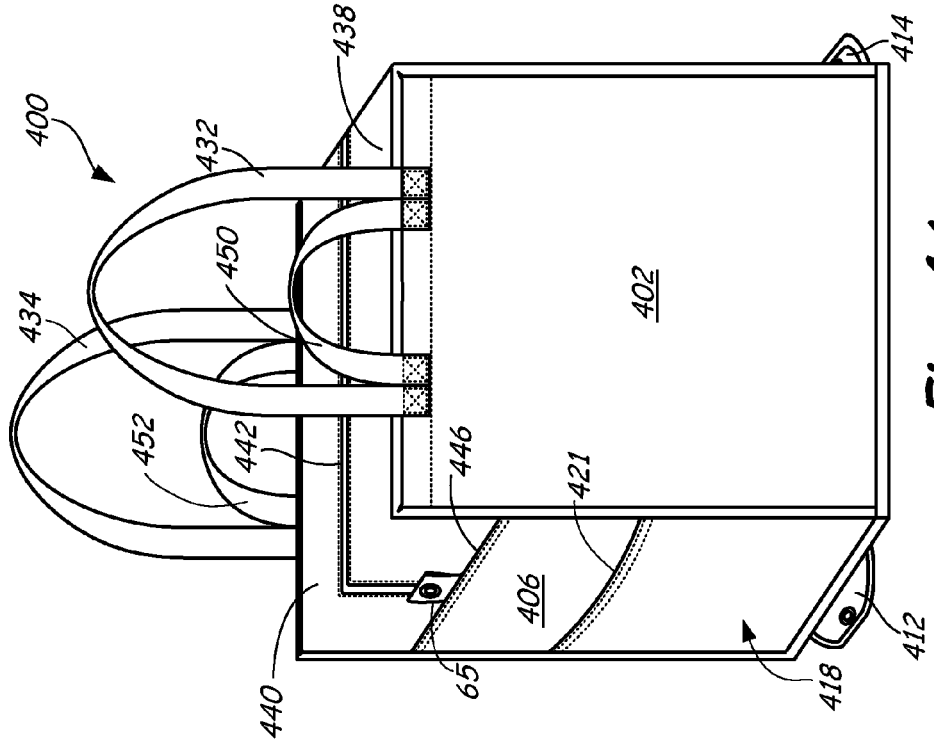

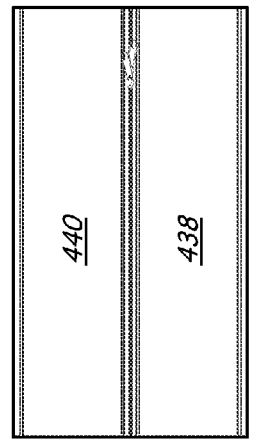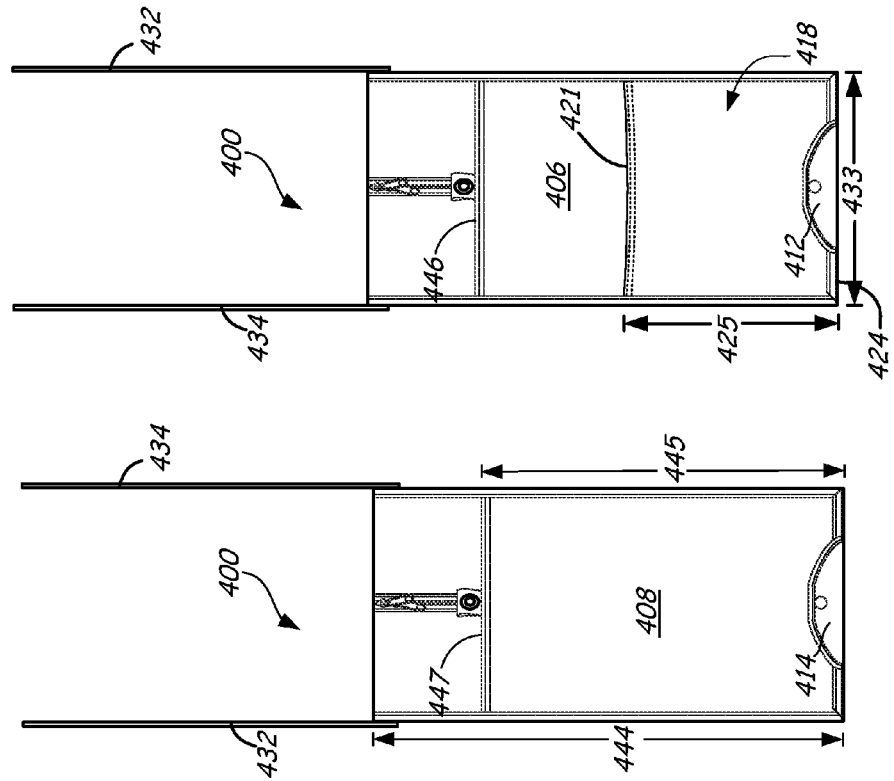

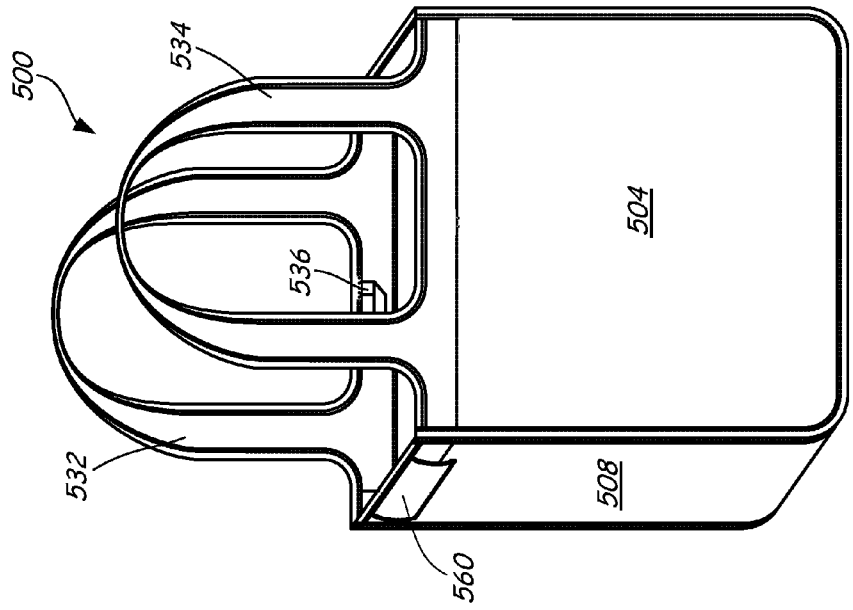
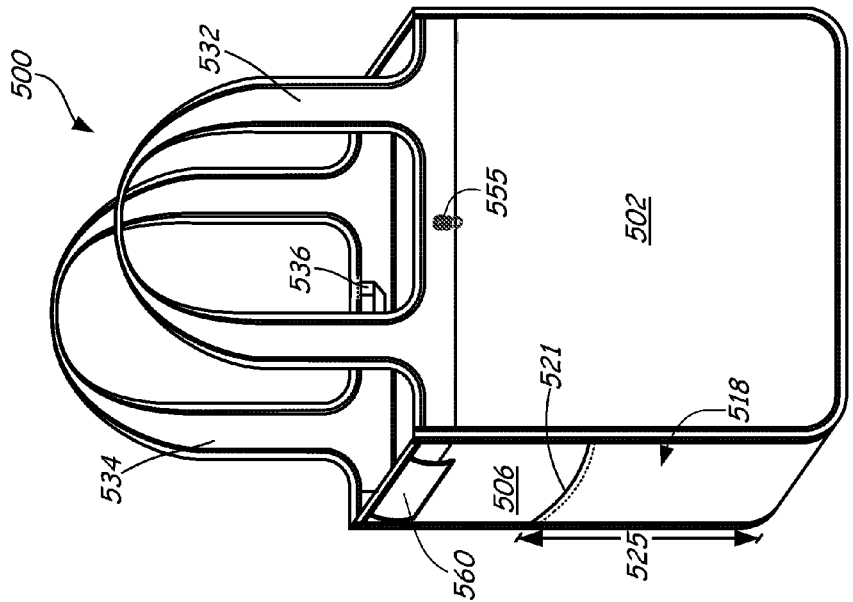

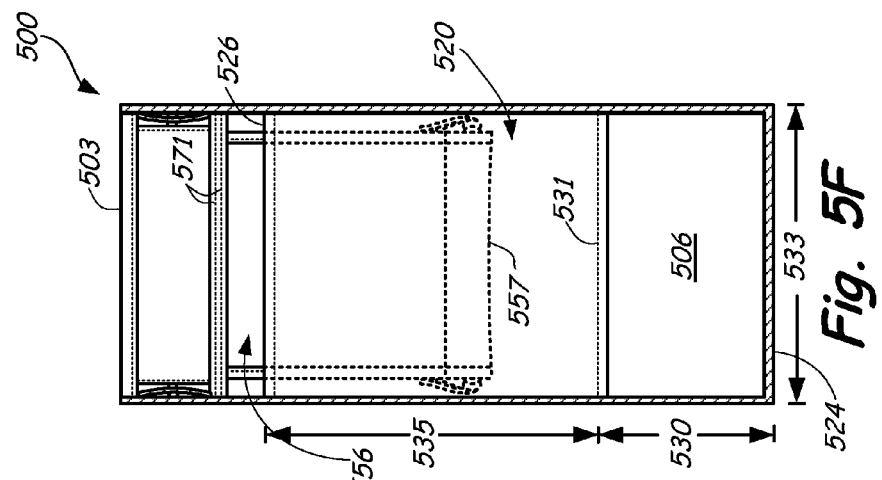
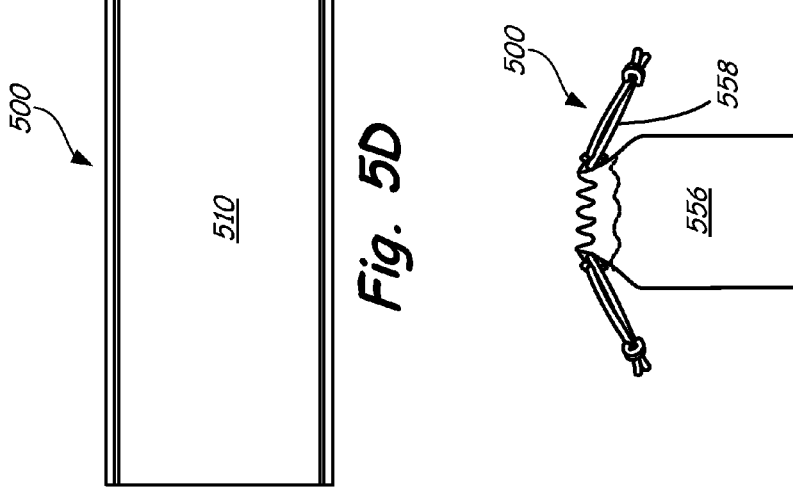
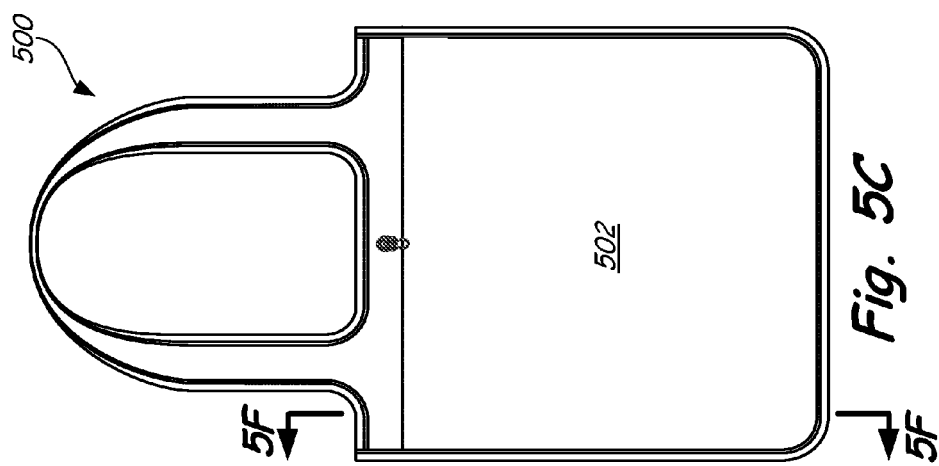

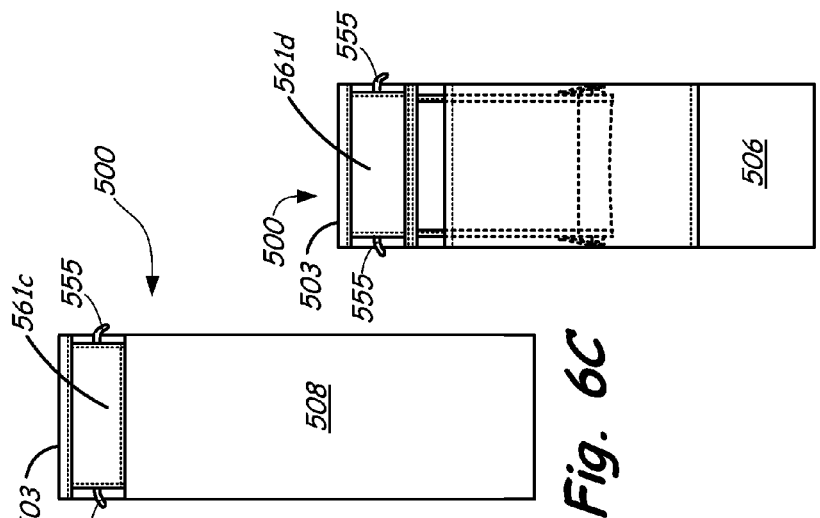
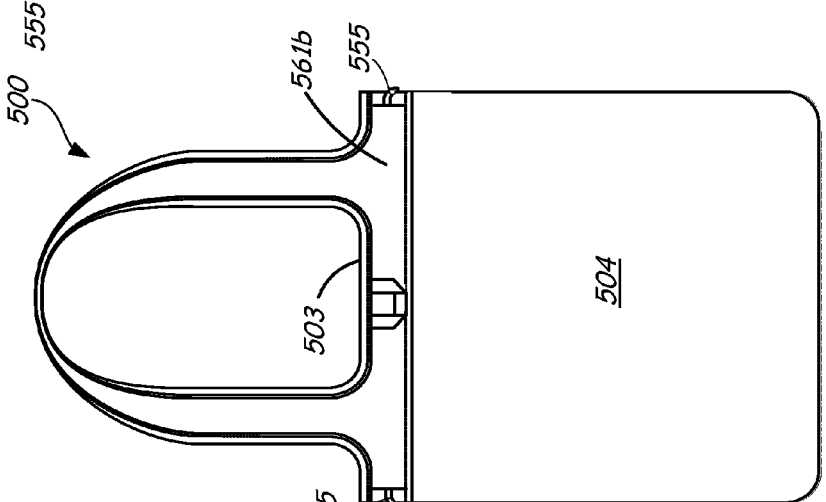
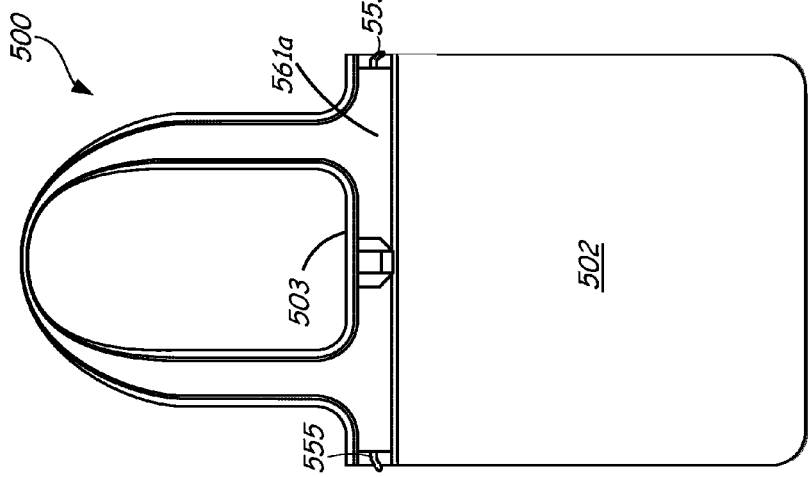

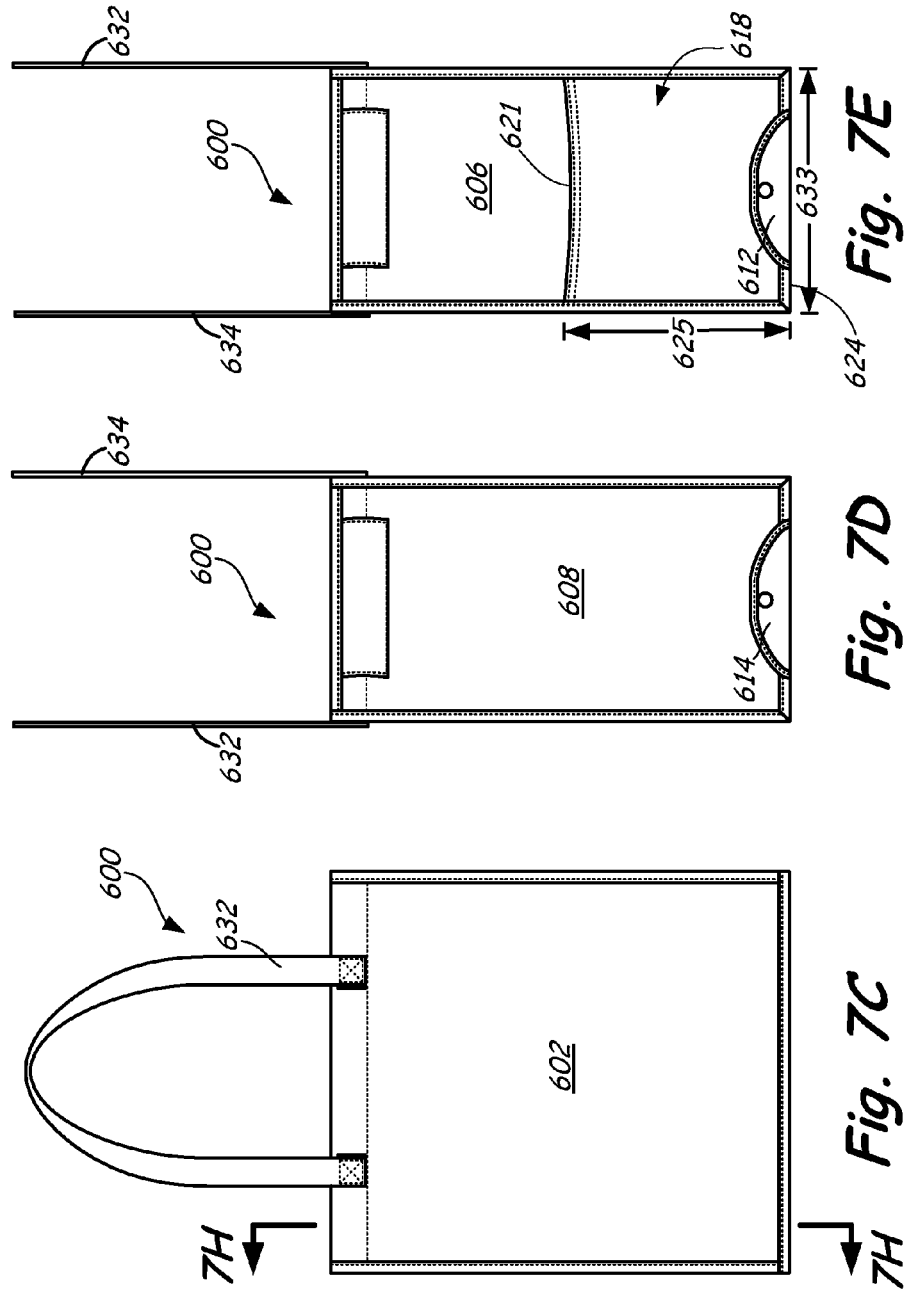

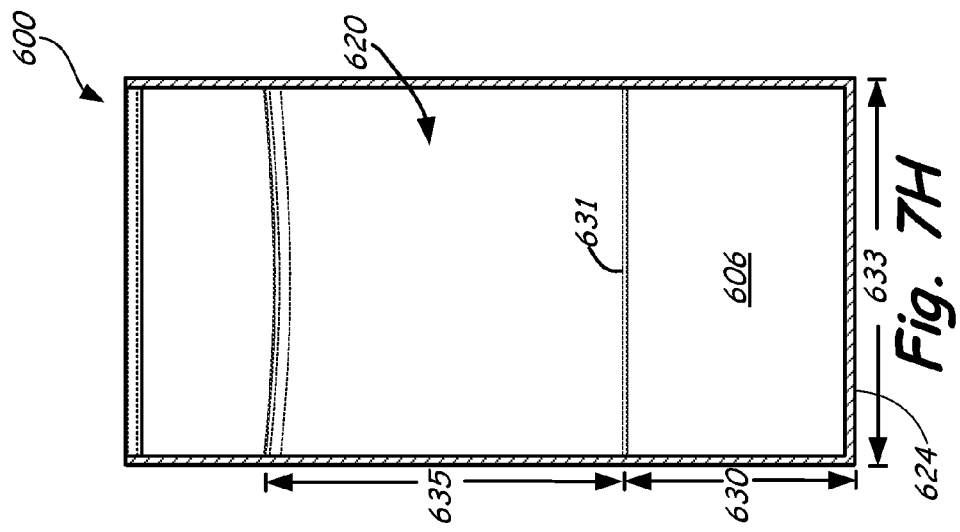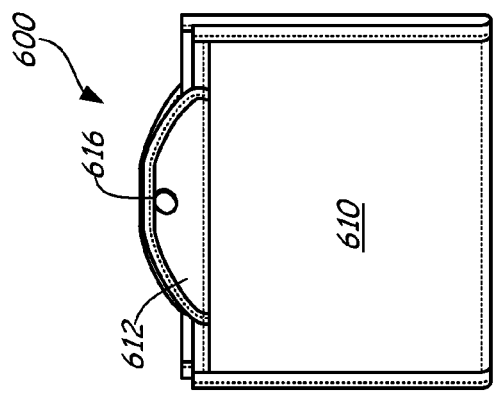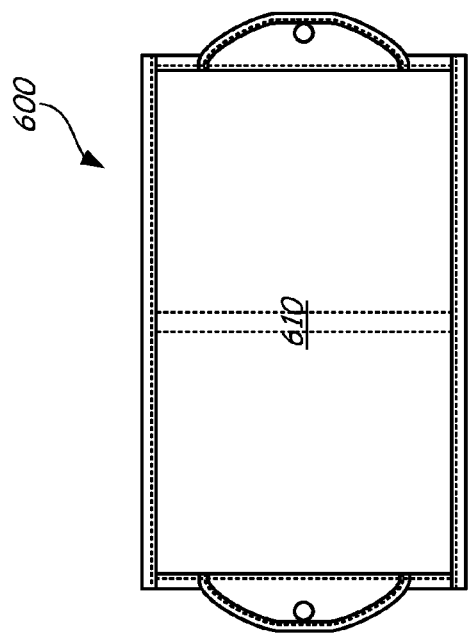

REUSABLE BAG

CROSS-REFERENCE TO RELATED APPLICATION

The present application is based on and claims the benefit of U.S. provisional patent application Ser. No. 61/577,985, filed Dec. 20, 2011, the content of which is hereby incorporated by reference in its entirety.

BACKGROUND

Reusable shopping bags are considered a sustainable alternative to using single-use plastic or paper bags when carrying groceries or other purchased items away from a retail establishment. The reusable bags are made of a durable material and can be reused many times over.

The discussion above is merely provided for general background information and is not intended to be used as an aid in determining the scope of the claimed subject matter.

SUMMARY

A bag includes an interior pocket and an exterior pocket. The interior pocket is attached to a wall of the bag along a seam that is stitched across a width of the wall. The seam is located at a height from a bottom of the wall. The exterior pocket is attached to the bottom of the wall of the bag and has a top edge extending across the width of the wall. The top edge of the exterior pocket is located a height from the bottom of the wall. The height of the top edge of the exterior pocket is greater than the height of the seam of the interior pocket.

In one embodiment, the bag includes a bottom and four sides. A cord extends along all four sides of the bag and is located proximate to the upper edge of the bag to cinch the upper edges of the bag together. The cord is partially enclosed within at least one sleeve that is attached to an interior of the bag by a sleeve seam. A stuff sack includes a closed end and an open end. The closed end of the stuff sack is attached to the interior of the bag along the sleeve seam of the at least one sleeve.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF DRAWINGS

FIGS. 1A-1H illustrate front perspective, rear perspective, front, right side, left side, bottom, folded exterior and section views of a reusable bag according to one embodiment.

FIGS. 2A-2I illustrate front perspective, rear perspective, front, right side, left side, top, bottom, folded exterior and section views of a reusable bag according to another embodiment.

FIGS. 4A-4J illustrate front perspective, rear perspective, front, back, right side, left side, top, bottom, folded exterior and section views of a reusable bag according to yet another embodiment.

FIGS. 5A-5F illustrates front perspective, rear perspective, front, bottom, packed down exterior and section views of a reusable bag according to yet another embodiment.

FIGS. 6A-6D illustrate interior views of the front, the back and two opposing sides of the reusable bag illustrated in FIGS. 5A-5F.

FIGS. 7A-7H illustrate front perspective, rear perspective, front, right side, left side, bottom, folded exterior and section views of a reusable bag according to yet another embodiment.

DETAILED DESCRIPTION

Figure 3A:
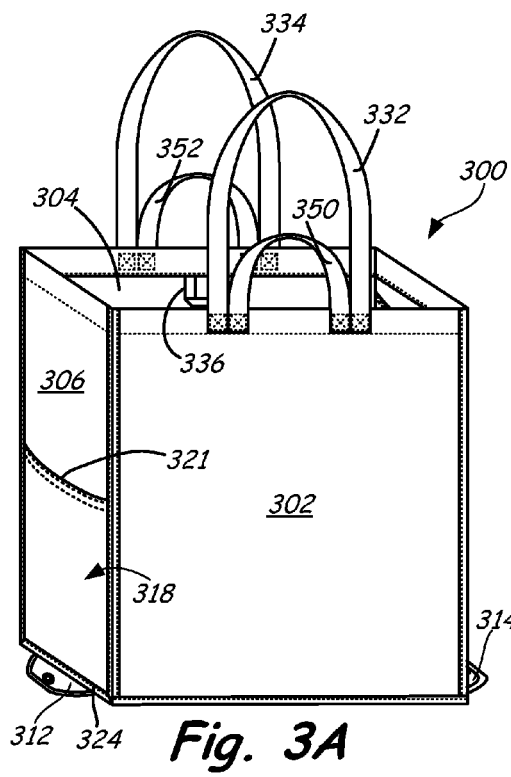
FIGS. 3A-3C illustrate front perspective, rear perspective and bottom views of yet another embodiment.

Embodiments described herein include a reusable bag having both an internal pocket and an external pocket. The internal pocket is located higher above the bottom of the bag than the external pocket and on the same side wall of the bag as the external pocket. In this way, the seam of the internal pocket is hidden from view by the external pocket.

The reusable bag has two configurations, a loadable configuration and storage configuration. In the loadable configuration, the reusable bag is erected for loading with items. In the storage configuration, the reusable bag is collapsed down into a compact state after the items are emptied. For example, the side walls of the reusable bag can be collapsed down against the bottom wall. The bottom wall can be folded and snapped together into a compact shape. In another example, the reusable bag can be stuffed into a stuff sack that is attached to one of the side walls. Not only is the reusable bag made of a variety of different materials, but the reusable bag also includes a variety of optional features and embodiments. In one exemplary embodiment, the reusable bag includes a removable carry strap. In another exemplary embodiment, the reusable bag includes a fastened top, such as a zip-top or a cinch-top. In yet another exemplary embodiment, the reusable bag includes side channels for receiving a bag rack assembly during loading.

FIGS. 1A-1H illustrate front perspective, rear perspective, front, right side, left side bottom, folded exterior and section views of a reusable bag 100 according to one embodiment. FIGS. 1A-1F illustrate reusable bag 100 in a loadable configuration and FIG. 1G illustrates reusable bag 100 in a folded down or compact state. FIG. 1B illustrates back wall 104 as being transparent, however, this is for purposes of illustrating the interior (in phantom) of left side wall 106 only and does not mean that the back wall 104 is necessarily transparent.

Reusable bag 100 includes a plurality of side walls including a front wall 102, an opposing back wall 104, a left side wall 106 and an opposing right side wall 108. Bag 100 also includes a bottom wall 110. Together front wall 102, back wall 104, left side wall 106, right side wall 108 and bottom wall 110 define a main compartment of bag 100. Left side wall 106 includes an inner facing surface 111 and an outer facing surface 113. Bottom wall 110 is configured to couple the front wall 102 to the back wall 104 and the left side wall 106 to the right side wall 108. In one embodiment, front wall 102, back wall 104, left side wall 106, right side wall 108 and bottom wall 110 are each made of a panel of material. Reusable bag 100 can be made of polypropylene and, in particular, a woven polypropylene. However, other materials are possible including other types of woven and non-woven poly-synthetic fiber materials and different types of fabrics consisting of natural or artificial fibers.

Attached to left side wall 106 are an exterior pocket 118 and an interior pocket 120 (shown in phantom lines in FIG. 1B and shown in the FIG. 1H section view) that are separate from the main compartment of bag 100. Exterior and interior pockets 118 and 120 provide the user of bag 100 a way to more easily manage important or fragile items that they would like to keep separate from the items stored in the main compartment. Exterior pocket 118 includes a top edge 121, sides 122 and 123 and a bottom 124. Top edge 121 extends across a width 133 of left side wall 106 and forms a free end while sides 122 and 123 and bottom 124 form fixed ends such that the material of pocket 118 and outer facing surface 113 of side wall 106 forms an exterior compartment or exterior storage space. In other words, side 122 attaches to an exterior of bag 100 where left side wall 106 attaches to back wall 104, side 123 attaches to the exterior of bag 100 where left side wall 106 attaches to front wall 102 and bottom 124 attaches to the exterior of bag 100 where left side wall 106 attaches to bottom wall 110. Top edge 121 of exterior pocket 118 is positioned a vertical distance or height 125 (FIG. 1E) from the bottom 124 of exterior pocket 118 or where bottom wall 110 is attached to left side wall 106. Vertical distance or height 125 is also the depth of exterior pocket 118.

Interior pocket 120 includes a top edge 126, sides 127 and 128 and a bottom 129. Top edge 126 forms a free end, while sides 127 and 128 and bottom 129 form fixed ends such that the material of pocket 120 and inner facing surface 111 of left side wall 106 forms an interior compartment or an interior storage space. In other words, side 127 attaches to an interior of bag 100 where left side wall 106 attaches to back wall 104 and side 128 attaches to the interior of bag 100 where left side wall 106 attaches to front wall 102. Bottom 129 is stitched to left side wall 106 by a seam 131. Seam 131 extends across a width 133 of left side wall 106 and is located a vertical distance or height 130 (FIG. 1H) from where bottom wall 110 is stitched to left side wall 106. Height 125 of exterior pocket 118 is greater than height 130 of seam 131. Therefore, seam 131 is hidden by exterior pocket 118. Although exterior and interior pockets 118 and 120 are attached to left side wall 106, similar exterior and interior pockets can be additionally or alternatively attached to right side wall 108, front wall 102, back wall 104 and/or bottom wall 110.

In one embodiment, a depth 135 of interior pocket 120 is substantially the same as depth 125 of exterior pocket 118. In addition, depths 135 and 125 of substantially similar exterior pocket 118 and interior pocket 120 are less than a height of left side panel 106. In this way, exterior and interior pockets 118 and 120 are easy for a user of bag 100 to reach their arm or hand into for accessing the items stored in those pockets.

With reference back to FIG. 1A, coupled to outer facing surface of front wall 102 are a pair of handles 132 and 134. Handle 132 is made of a webbing strap and is coupled to the outer facing surface of front wall 102. Handle 134 is also made of a webbing strap 134 and is coupled to the outer facing surface of back wall 102. First and second handles 132 and 134 are substantially identical in size and shape and are used for carrying reusable bag 100. In addition, reusable bag includes an additional strap 136 attached to an inner facing surface of back wall 104. Strap 136 is for use in mounting bag 100 to a bag rack assembly for loading.

In practice, front wall 102, back wall 104 and side walls 106 and 108 are erected relative to bottom wall 110 to load at least the main compartment of bag 100 with items. After the bag is emptied of its items, bag 100 can be placed in a storage configuration as illustrated in FIG. 1G. In this configuration, the front wall 102, back wall 104, side walls 106 and 108 and handles 132 and 134 are collapsed against bottom wall 110 so that bottom wall 110 folds in half and bottom flaps 112 and 114 snap together with a fastener 116. In this way, side walls 102, 104, 106 and 108 are enclosed by bottom wall 110.

FIGS. 2A-2I illustrate front perspective, rear perspective, front, right side, left side, top, bottom, folded exterior and section views of a reusable bag 200 according to another embodiment. FIGS. 2A-2G illustrate reusable bag 200 in a loadable configuration and FIG. 2H illustrates reusable bag 200 in a folded down or compact state. FIG. 2B illustrates the back wall as being transparent, however, this is for purposes of illustrating the interior (in phantom) of left side wall 206 only and does not mean that the back wall is necessarily transparent.

Reusable bag 200 includes a plurality of side walls including a front wall 202, an opposing back wall, a left side wall 206 and an opposing right side wall 208. Bag 100 also includes a bottom wall 210. Together front wall 202, the back wall, left side wall 206, right side wall 208 and bottom wall 210 define a main compartment of bag 200. Bottom wall 210 is configured to couple front wall 202 to the back wall and the left side wall 206 to the right side wall 208. In one embodiment, front wall 202, the back wall, left side wall 206, right side wall 208 and bottom wall 210 are each made of a panel of material. Reusable bag 200 can be made of polypropylene and, in particular, a woven polypropylene. However, other materials are possible including other types of woven and non-woven poly-synthetic fiber materials and different types of fabrics consisting of natural or artificial fibers.

Like reusable bag 100, attached to left side wall 206 are an exterior pocket 218 and an interior pocket 220 that are separate from the main compartment of bag 200. Exterior and interior pockets 218 and 220 provide the user of bag 200 a way to more easily manage important or fragile items that they would like to keep separate from the items stored in the main compartment. Exterior pocket 218 and interior pocket 220 include similar features as the exterior and interior pockets 118 and 120 of reusable bag 100 including exterior pocket 218 hiding the seam 231 of the interior pocket 220. Exterior pocket 218 includes a top edge 221 that extends across a width 233 of left side wall 206 and is positioned a vertical distance or height 225 (FIG. 2E) from the bottom 224 of exterior pocket 218 or where bottom wall 210 is attached to left side wall 206. Vertical distance or height 225 is also the depth of exterior pocket 118. Interior pocket 220 is attached to left side wall 206 along a seam 231 that extends across width 233 of left side wall 206 and is positioned a vertical distance or height 230 (FIG. 2I) from where bottom wall 210 is attached to left side wall 206. Height 225 is greater than height 230. Although exterior pocket 218 and interior pocket 220 are attached to left side wall 206, similar exterior and interior pockets can be additionally or alternatively attached to right side wall 208, front wall 202, the back wall and bottom wall 210.

In one embodiment, a depth 235 of interior pocket 220 is substantially the same as depth 225 of exterior pocket 218. In addition, the depths 235 and 225 of substantially similar exterior pocket 218 and interior pocket 220 are less than a height of left side panel 206. In this way, exterior and interior pockets 218 and 220 are easy for a user of bag 200 to reach their arm or hand into for accessing the items stored in those pockets.

In addition, reusable bag 200 includes handles 232 and 234. Handle 232 is made of a webbing strap that is coupled to an outer facing surface of front wall 202 and handle 234 is made of a webbing strap that is coupled to an outer facing surface of the back wall 204. As in reusable bag 100, first and second handles 232 and 234 are substantially identical in size and shape and are used for carrying reusable bag 200. In addition, an additional strap 236 is attached to the outer facing surface of the back wall of reusable bag 200 for use in mounting bag 200 to a bag rack assembly for loading.

Unlike reusable bag 100, reusable bag 200 includes a first top panel 238 coupleable to a second top panel 240. For example and as illustrated in FIGS. 2A, 2B and 2D-2F, first top panel 238 and second top panel 240 are coupled to each other with a zipper 242. However, it should be realized that other means of coupling panels 238 and 240 together are possible. Also unlike reusable bag 100, upper edges 246 and 247 of left and right side walls 206 and 208 do not extend an entire height 244 (FIG. 2D) of bag 200. Rather, left side wall 206 and right side wall 208 extend a height 245 (FIG. 2D) that is less than height 244 of reusable bag 200. Attached to upper edge 246 of left side wall 206 and the upper edge 247 of right side wall 208 are the first and second top panels 238 and 240. In particular, first top panel 238 and second top panel 240 extend from upper edge 246 of left side wall 206 to upper edge 247 of right side wall 208.

In practice, front wall 202, the back wall and side walls 206 and 208 are erected relative to bottom wall 210 to load at least the main compartment of bag 200 with items. After the bag is emptied of its items, bag 200 can be placed in a storage configuration as illustrated in FIG. 2H. In this configuration, front wall 202, the back wall, side walls 206 and 208 and handles 232 and 234 are collapsed against bottom wall 210 so that bottom wall 210 folds in half and bottom flaps 212 and 214 snap together with a fastener 216. In this way, the side walls are enclosed by bottom wall 210.

Figure 3B:
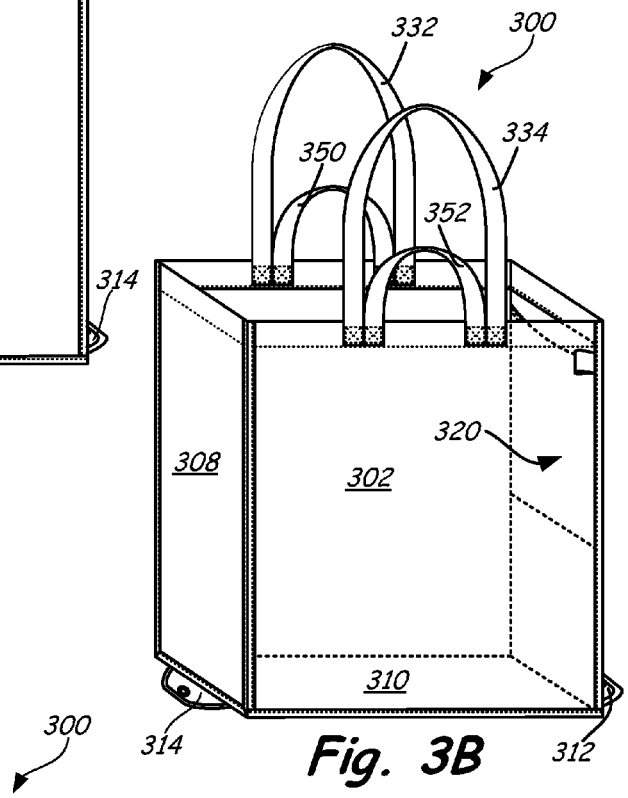
Figure 3C:
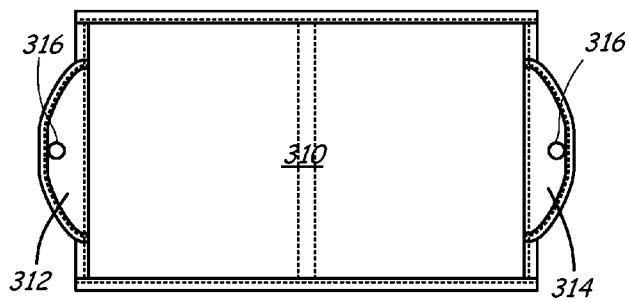

FIGS. 3A-3C illustrate front perspective, back perspective and bottom views of a reusable bag 300 according to yet another embodiment. FIGS. 3A-3C illustrate reusable bag 100 in a loadable configuration. FIG. 3B illustrates the back wall as being transparent, however, this is for purposes of illustrating the interior (as illustrated in phantom) of left side wall 306 only and does not mean that the back wall 304 is necessarily transparent.

Reusable bag 300 includes a plurality of side walls including a front wall 302, an opposing back wall 304, a left side wall 306 and an opposing right side wall 308. Bag 300 also includes a bottom wall 310. Together front wall 302, back wall 304, left side wall 306, right side wall 308 and bottom wall 310 define a main compartment of bag 300. Bottom wall 310 is configured to couple front wall 302 to back wall 304 and left side wall 306 to right side wall 308. In one embodiment, front wall 302, back wall 304, left side wall 306, right side wall 308 and bottom wall 310 are each made of a panel of material. Reusable bag 300 can be made of polypropylene and, in particular, a woven polypropylene. However, other materials are possible including other types of woven and non-woven poly-synthetic fiber materials and different types of fabrics consisting of natural or artificial fibers.

Like reusable bag 100, attached to left side wall 306 of reusable bag 300 are an exterior pocket 318 and an interior pocket 320 that are separate from the main compartment of bag 300. Exterior and interior pockets 318 and 320 provide the user of bag 300 a way to more easily manage important or fragile items that they would like to keep separate from the items stored in the main compartment. Exterior pocket 318 and interior pocket 320 include similar features as the exterior and interior pockets 118 and 120 of reusable bag 100 including exterior pocket 318 hiding the seam of the interior pocket 320. Exterior pocket 318 includes a top edge 321 that extends across a width of left side wall 306 and is positioned a vertical distance or height from the bottom 324 of exterior pocket 318 or where bottom wall 310 is attached to left side wall 306. Interior pocket 320 is attached to left side wall 306 along a seam that extends across the width of left side wall 306 and is positioned a vertical distance or height from where bottom wall 310 is attached to left side wall 306. The height of top edge 321 is greater than the height of the seam. Although exterior pocket 318 and interior pocket 320 are attached to first side wall 306, similar exterior and interior pockets can be additionally or alternatively attached to right side wall 308, front wall 302, back wall 304 and bottom wall 310.

In one embodiment, a depth of interior pocket 320 is substantially the same as a depth of exterior pocket 318. In addition, the depths of substantially similar exterior pocket 318 and interior pocket 320 are less than a height of left side panel 306. In this way, exterior and interior pockets 318 and 320 are easy for a user of bag 300 to reach their arm or hand into for accessing the items stored in those pockets.

In addition, reusable bag 300 has a primary set of handles 332 and 334 made of webbing straps for carrying the bag including primary handle 332 attached to the outer facing surface of front wall 302 and primary handle 334 attached to the outer facing surface of back wall 304. As in reusable bag 100, primary handles 332 and 334 are substantially identical in size and shape and are used for carrying reusable bag 300.

Unlike reusable bag 100, reusable bag 300 includes a secondary set of handles 350 and 352 made of webbing straps for carrying the bag including secondary handle 350 and secondary handle 352. Secondary handle 350 is attached to the outer facing surface of first wall 302 and is positioned between the attachment points of the primary handle 332. Secondary handle 352 is attached to the outer facing surface of back wall 304 and is positioned between the attachment points of primary handle 334, but outwardly from the attachment points of strap 336. Strap 336 is attached to the inner facing surface of back wall 304 of reusable bag 300 for use in mounting bag 300 to a bag rack assembly for loading.

In practice, front wall 302, back wall 304 and side walls 306 and 308 are erected relative to bottom wall 310 to load at least the main compartment of bag 300 with items. Although not particularly illustrated in FIGS. 3A-3C, after the bag is emptied of its items, bag 300 can be placed in a storage configuration. In this configuration, front wall 302, back wall 304, side walls 306 and 308, primary handles 332 and 334 and secondary handles 350 and 352 are collapsed against bottom wall 310 so that bottom wall 310 can fold in half and bottom flaps 312 and 314 snap together with a fastener 316. In this way, the side walls of reusable bag 300 are enclosed by bottom wall 310.

Figure 4D:
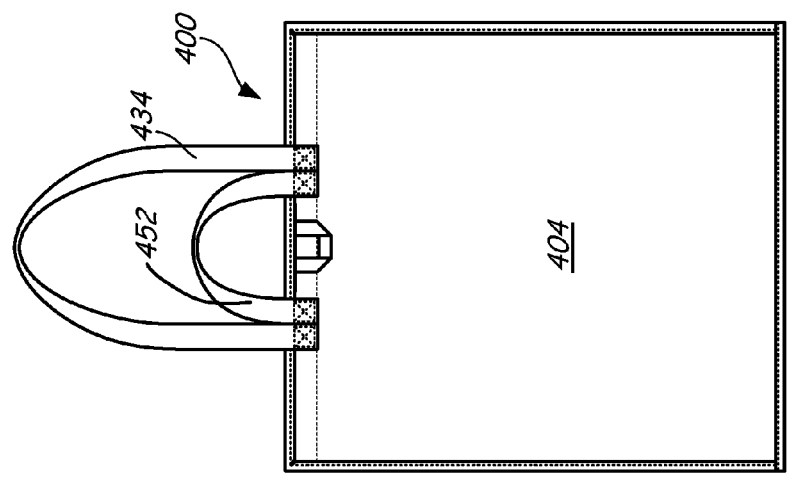
Figure 4C:
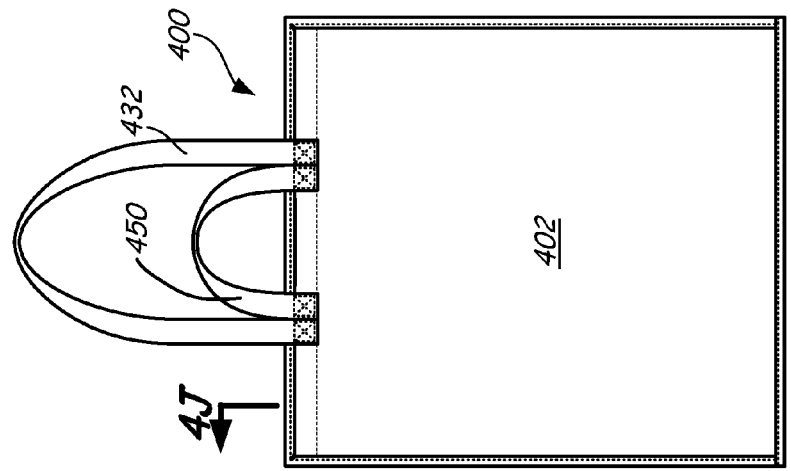
Figure 4H:
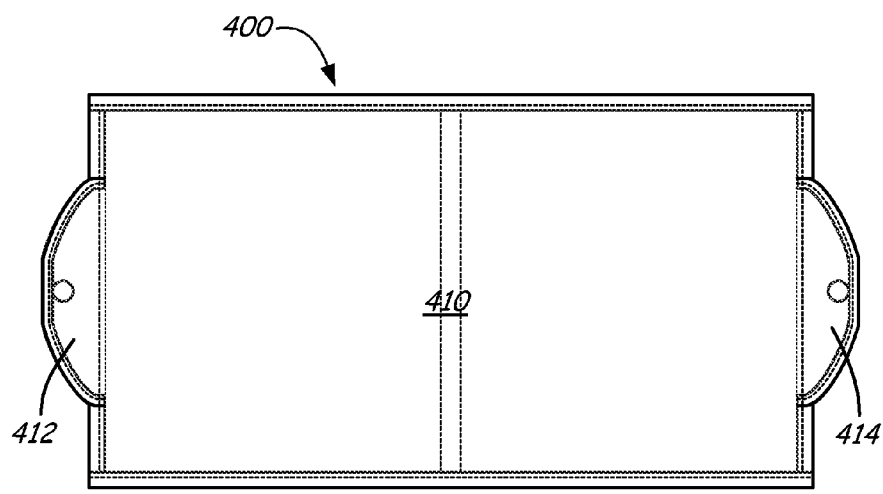
Figure 4I:
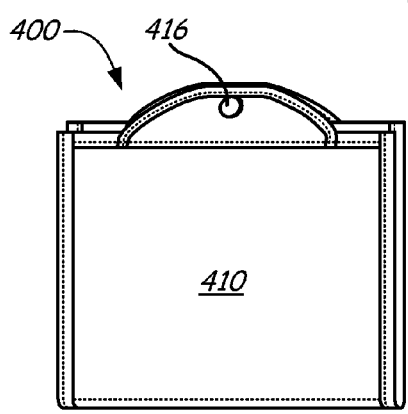
Figure 4J:
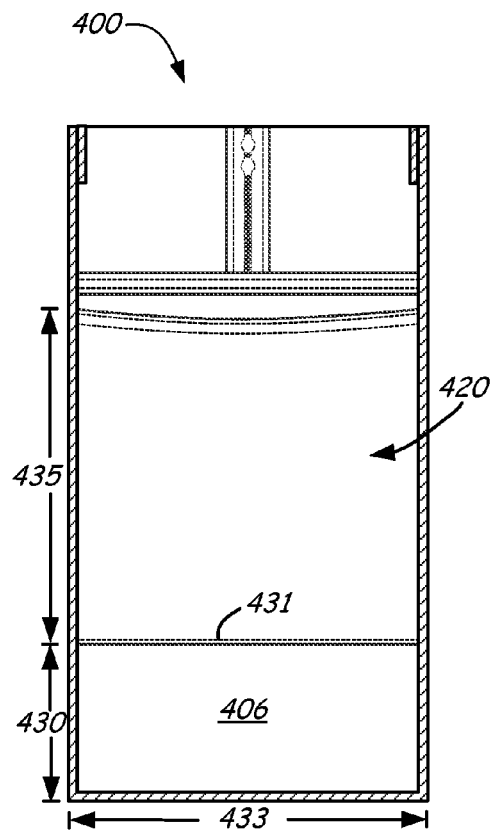

FIGS. 4A-4J illustrate front perspective, back perspective, front, back, right side, left side, top, bottom, folded exterior and section views of a reusable bag 400 according to yet another embodiment. FIGS. 4A-4H illustrate reusable bag 400 in a loadable configuration and FIG. 4I illustrates reusable bag 400 in a folded down or compact state. FIG. 4B illustrates back wall 404 as being transparent, however, this is for purposes of illustrating the interior (in phantom) of left side wall 406 only and does not mean that the back wall 404 is necessarily transparent.

Reusable bag 400 includes a plurality of side walls including a front wall 402, an opposing back wall 404, a left side wall 406 and a right side wall 408. Bag 400 also includes a bottom wall 410. Together front wall 402, back wall 404, left side wall 406, right side wall 408 and bottom wall 410 define a main compartment of bag 400. Bottom wall 410 is configured to couple front wall 402 to back wall 404 and the left side wall 406 to right side wall 408. In one embodiment, front wall 402, back wall 404, left side wall 406, right side wall 408 and bottom wall 410 are each made of a panel of material. Reusable bag 400 can be made of polypropylene and, in particular, a woven polypropylene. However, other materials are possible including other types of woven and non-woven poly-synthetic fiber materials and different types of fabrics consisting of natural or artificial fibers.

Like reusable bag 300, attached to left side wall 406 of reusable bag 400 are an exterior pocket 418 and an interior pocket 420 that are separate from the main compartment of bag 400. Exterior and interior pockets 418 and 420 provide the user of bag 400 a way to more easily manage important or fragile items that they would like to keep separate from the items stored in the main compartment. Exterior pocket 418 and interior pocket 420 include similar features as the exterior and interior pockets 118 and 120 of reusable bag 100 including exterior pocket 418 hiding the seam 431 of the interior pocket 420. Exterior pocket 418 includes a top edge 421 that extends across a width 433 of left side wall 406 and is positioned a vertical distance or height 425 (FIG. 4F) from the bottom 424 of exterior pocket 118 or where bottom wall 410 is attached to left side wall 406. Vertical distance or height 425 is also the depth of exterior pocket 418. Interior pocket 420 is attached to left side wall 406 along a seam 431 that extends across width 433 of left side wall 406 and is positioned a vertical distance or height 430 (FIG. 4J) from where bottom wall 410 is attached to left side wall 406. Height 425 is greater than height 430. Although exterior pocket 418 and interior pocket 420 are attached to left side wall 406, similar exterior and interior pockets can be additionally or alternatively attached to the right side wall 408, front wall 402, back wall 404 and bottom wall 410.

In one embodiment, a depth 435 of interior pocket 420 is substantially the same as depth 425 of exterior pocket 418. In addition, the depths 435 and 425 of substantially similar exterior pocket 418 and interior pocket 420 are less than a height of left side panel 406. In this way, exterior and interior pockets 418 and 420 are easy for a user of bag 400 to reach their arm or hand into for accessing the items stored in those pockets.

In addition, reusable bag 400 includes a primary set of handles 432 and 434 that are made of webbing straps and a secondary set of handles 450 and 452 that are also made of webbing straps. Primary handle 432 is attached to the outer facing surface of front wall 402, primary handle 434 is attached to the outer facing surface of back wall 404, secondary handle 450 is attached to the outer facing surface of the front wall 402 and positioned between the attachment points of primary handle 432 and secondary handle 452 is attached to the outer facing surface of back wall 404 and positioned between the attachment points of primary handle 434. As in reusable bag 300, primary handles 432 and 434 are substantially identical in size and shape and are used for carrying reusable bag 400. Secondary handles 450 and 452 are substantially identical in size and shape, are smaller to primary handles 432 and 434, but are used as an alternative way of carrying reusable bag 400. In addition, an additional strap 436 is attached to the outer facing surface of back wall 404 of reusable bag 400 for use in mounting bag 400 to a bag rack assembly for loading.

Like reusable bag 200, reusable bag 400 includes a first top panel 438 coupleable to a second top panel 440. For example and as illustrated in FIGS. 4A-4B and 4E-4G, first top panel 438 and second top panel 440 are coupled to each other with a zipper 442. Also like reusable bag 200, an upper edge 446 of first side wall 406 and an upper edge 447 of the opposing right side wall 408 do not extend an entire height 444 of bag 400. Rather, upper edges 446 and 447 of left side wall 406 and opposing right side wall 408 extend a height 445 that is less than the height 444 of reusable bag 400. Attached to upper edge 446 of left side wall 406 and upper edge 447 of right side wall 408 are the first and second top panels 438 and 440. In particular, first top panel 438 and second top panel 440 extend from top edge 446 of left side wall 406 to the top edge 447 of right side wall 408.

In practice, front wall 402, back wall 404 and side walls 406 and 408 are erected relative to bottom wall 410 to load at least the main compartment of bag 400 with items. After the bag is emptied of its items, bag 400 can be placed in a storage configuration as illustrated in FIG. 4I. In this configuration, front wall 402, back wall 404, side walls 406 and 408, primary handles 432 and 434 and secondary handles 450 and 452 are collapsed against bottom wall 410 so that bottom wall 410 folds in half and bottom flaps 412 and 414 snap together with a fastener 416. In this way, the side walls are enclosed by bottom wall 410.

FIGS. 5A-5F illustrate front perspective, back perspective, front, bottom, compressed exterior and section views of a reusable bag 500 according to yet another embodiment. FIGS. 5A-5D illustrate reusable bag 500 in a loadable configuration and FIG. 5E illustrates reusable bag 500 in a compressed or compact state. Reusable bag 500 can be made of a fabric, such as nylon. However, other materials are possible including other types of fabrics consisting of natural or artificial fibers and woven or non-woven poly-synthetic fiber materials.

Reusable bag 500 includes a plurality of side walls including a front wall 502, an opposing back wall 504, a left side wall 506 and an opposing right side wall 508. Bag 500 includes a bottom wall 510. Together front wall 502, back wall 504, left side wall 506, right side wall 508 and bottom wall 510 define a main compartment of bag 500. Bottom wall 510 is configured to couple front wall 502 to back wall 504 and left side wall 506 to right side wall 508. More particularly, left side wall 506, bottom wall 510 and right side wall 508 are made of a single panel of material, while front wall 502 and back wall 504 are made of separate panels of material that stitch to the single panel of material that makes up the bottom and side walls. Reusable bag 500 also includes a bag drawstring 555 that extends along all four sides (front wall 502, back wall 504, left side wall 506 and right side wall 508) and is proximate to upper edge 503 of bag 500 and cinches the open top of bag 500 shut.

Like reusable bag 100, attached to left side wall 506 are an exterior pocket 518 and an interior pocket 520 that are separate from the main compartment of bag 500. Exterior and interior pockets 518 and 520 provide the user of bag 500 a way to more easily manage important or fragile items that they would like to keep separate from the items stored in the main compartment. Such exterior and interior pockets 518 and 520 include similar features as the exterior and interior pockets 118 and 120 of reusable bag 100 including exterior pocket 518 hiding a seam 531 of interior pocket 520. Exterior pocket 518 includes a top edge 521 that extends across a width 533 of left side wall 506 and is positioned a vertical distance or height 525 from bottom 524. Vertical distance or height 525 is also the depth of exterior pocket 518. Interior pocket 520 is attached to left side wall 506 along seam 531 that extends across a width 533 of left side wall 506 and is positioned a vertical distance or height 530 from bottom wall 510. Height 525 is greater than height 530. Although exterior and interior pockets 518 and 520 are attached to left side wall 506, similar exterior and interior pockets can be additionally or alternatively attached to the right side wall 508, front wall 502, back wall 504 and bottom wall 510.

In one embodiment, a depth 535 of interior pocket 520 is substantially the same as depth 525 of exterior pocket 518. In addition, the depths 535 and 525 of substantially similar exterior pocket 518 and interior pocket 520 are less than a height of left side panel 506. In this way, exterior and interior pockets 518 and 520 are easy for a user of bag 500 to reach their arm or hand into for accessing the items stored in those pockets.

In practice, front wall 502, back wall 504 and side walls 506 and 508 are erected relative to bottom wall 510 to load at least the main compartment of bag 500 with items. After the bag is emptied of its items, bag 500 can be placed in a storage configuration as illustrated in FIG. 5E. In this configuration, all walls 502, 504, 506, 508 and 510 and handles 532 and 534 of reusable bag 500 are stuffed into a stuff sack 556 that is attached to an interior of reusable bag 500. Stuff sack 556 includes a sack drawstring 558 for cinching stuff sack 556 shut. As described, FIG. 5F illustrates a section view of reusable bag 500 to show the interior of left side wall 506 including phantom lines for illustrating stuff sack 556.

Stuff sack 556 includes a top edge 557, a bottom edge 559, side edges and sack drawstring 558. Sack drawstring 558 is partially enclosed by a peripheral channel located proximate to top edge 557. Bottom edge 559 is attached to left side wall 506. In particular, bottom edge 559 is sewn into the same seams that form the channel or sleeve located proximate a top edge 503 of the reusable bag 500 for partially enclosing bag drawstring 555. Therefore, seams 571 provide a dual function. The first being that seams 571 attach stuff sack 556 to left side wall 506 and, when bag 500 is in a loadable configuration, stuff sack 556 hangs from bottom edge 559 by seams 571 and is tucked out of the way into interior pocket 520. The second being discussed in detail in regards to FIGS. 6A-6D.

Unlike reusable bag 100, reusable bag 500 includes a first handle 532 and a second handle 534. First handle 532 is formed integrally with the panel of material of front wall 502. Second handle is formed integrally with the panel of material of back wall 504. While reusable bag 500 includes additional straps 536 as described in regards to bags 100 and 300, each of left side wall 506 and right side wall 508 also include substantially identical exterior through channels 560 attached to the outer facing surface of left side wall 506 and right side wall 508. Each exterior through channel 560 includes a first open end and a second open end. Each exterior through channel extends a distance from the first open end to the second open end that is less than a width of left side wall 506 and right side wall 508. The two open ended exterior through channels 560 allow the bag 500 to be mounted to arms of a bag rack assembly from either side of the bag. Not only is strap 536 used to engage with a bag rack assembly for loading, but exterior side channels 560 are also configured to engage with a bag rack assembly for loading the bag.

Unlike reusable bag 100, reusable bag 500, as illustrated in the interior front, back, right side and left side views in FIGS. 6A-6D, includes bag drawstring 555, which is partially enclosed by a plurality of interior channels or sleeves 561*a*, 561*b*, 561*c* and 561*d* located proximate a top edge 503 of reusable bag 500. Though each interior wall of reusable bag 500 includes an interior channel or sleeve 561, in other embodiments, a single interior channel or sleeve running through all walls is possible. As illustrated in FIGS. 6A-6D, each interior channel or sleeve 561*a*, 561*b*, 561*c* and 561*d* extends a distance across each wall that is less than the width of the wall. In this way, bag drawstring 555 is visible at each corner of bag 500 as it runs from interior channel to interior channel.

Figure 7B:
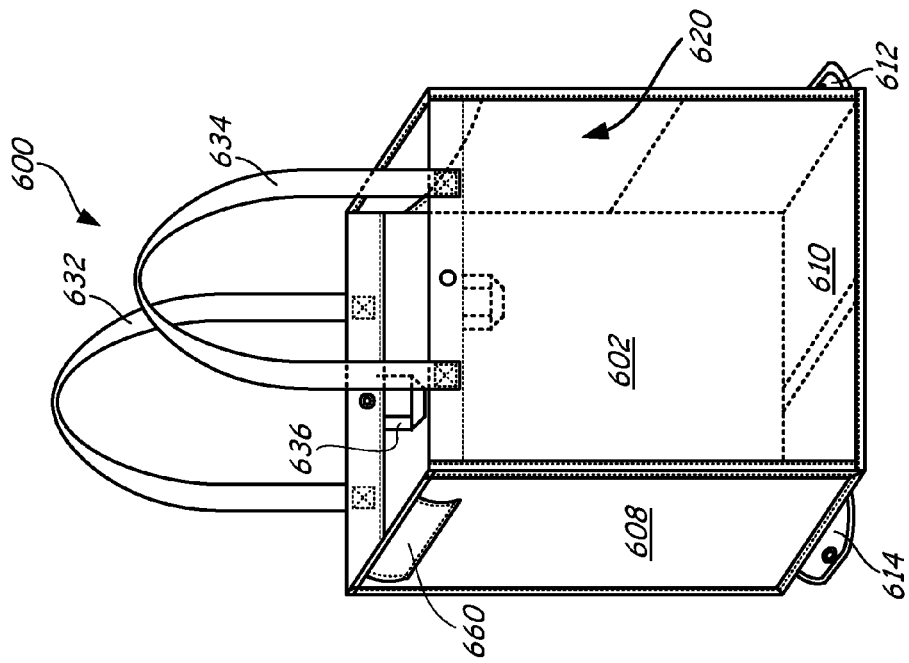
Figure 7A:
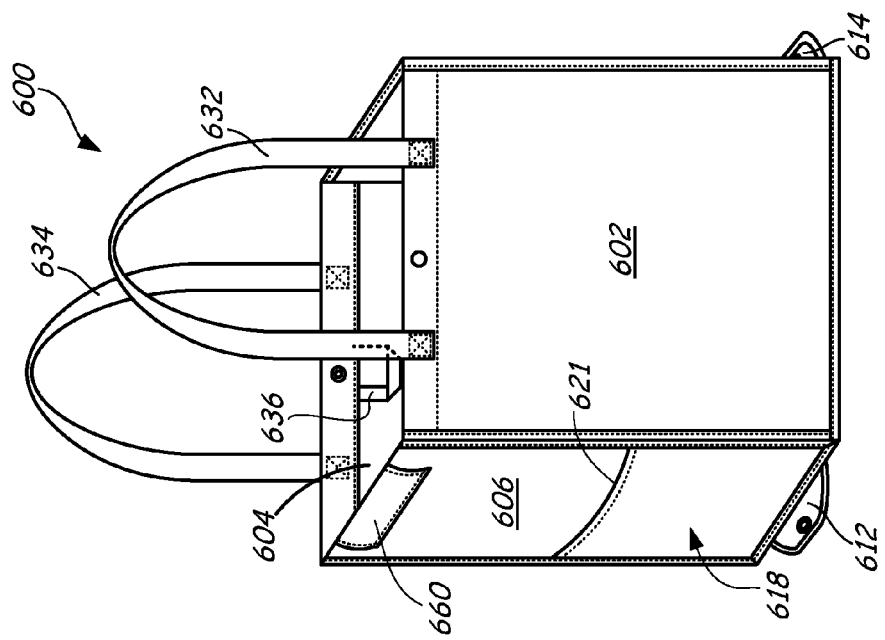

FIGS. 7A-7H illustrates front perspective, rear perspective, front, right side, left side, bottom, folded exterior and section views of a reusable bag 600 according to still another embodiment. FIGS. 7A-7F illustrate reusable bag 600 in a loadable configuration and FIG. 7H illustrates reusable bag 600 in a folded down or compact state. FIG. 7B illustrates back wall 604 as being transparent, however, this is for purposes of illustrating the interior (in phantom) of left side wall 606 only and does not mean that back wall 604 is necessarily transparent.

Reusable bag 600 includes a plurality of side walls including a front wall 602, an opposing back wall 604, a left side wall 606 and an opposing right side wall 608. Bag 600 also includes a bottom wall 610. Together front wall 602, back wall 604, left side wall 606, right side wall 608 and bottom wall 610 define a main compartment of bag 600. Bottom wall 610 is configured to couple front wall 602 to back wall 604 and left side wall 606 to right side wall 608. In one embodiment, front wall 602, back wall 604, left side wall 606, right side wall 608 and bottom wall 610 are each made of a panel of material. Reusable bag 600 is made of a fabric, such as canvas. However, other materials are possible including other types of fabrics consisting of natural or artificial fibers and woven or non-woven poly-synthetic fiber materials.

Like reusable bag 100, attached to left side wall 606 of reusable bag 600 are an exterior pocket 618 and an interior pocket 620 that are separate from the main compartment of bag 600. Exterior and interior pockets 618 and 620 provide the user of bag 600 a way to more easily manage important or fragile items that they would like to keep separate from the items stored in the main compartment. Exterior pocket 618 and interior pocket 620 include similar features as the exterior and interior pockets 118 and 120 of reusable bag 100 including exterior pocket 618 hiding a seam 631 of interior pocket 620. In particular, exterior pocket 618 includes a top edge 621 that extends across a width 633 of left side wall 606 and is positioned a height 625 from bottom 624 of exterior pocket 618 or where bottom wall 610 is attached to left side wall 606. Vertical distance or height 625 is also the depth of exterior pocket 618. Interior pocket 620 is attached to left side wall 606 along a seam 631 that extends across width 633 of left side wall 606 and is positioned at a height 630 from where bottom wall 610 is attached to left side wall 606. Height 625 is greater than height 630. Although exterior pocket 618 and interior pocket 620 are attached to left side wall 606, similar exterior and interior pockets can be additionally or alternatively attached to the right side wall 608, front wall 602, back wall 604 and bottom wall 610.

In one embodiment, a depth 635 of interior pocket 620 is substantially the same as depth 625 of exterior pocket 618. In addition, the depths 635 and 625 of substantially similar exterior pocket 618 and interior pocket 620 are less than a height of left side panel 606. In this way, exterior and interior pockets 618 and 620 are easy for a user of bag 600 to reach their arm or hand into for accessing the items stored in those pockets.

In addition, reusable bag 600 includes a first handle 632 coupled to the outer facing surface of front wall 602 and a second handle 634 coupled to the outer facing surface of back wall 604. As in reusable bag 100, first and second handles 632 and 634 are substantially identical in size and shape and are used for carrying reusable bag 600. Additional straps 636 are attached to inner facing surfaces of back wall 604 and front wall 602 of reusable bag 600. Not only are straps 636 used to engage with a bag rack assembly for loading, but side channels 660 located on the outer facing surface of left side wall 606 and right side wall 608 are also configured to engage with a bag rack assembly for loading the bag. Each exterior side channel 660 includes a first open end and a second open end and extends a distance from the first open end to the second open end that is less than a width of left side wall 606 and less than a width of right side wall 608. The two open-ended exterior side channels 660 allow the bag 600 to be mounted to arms of a bag rack from either side of the bag.

In practice, front wall 602, back wall 604 and side walls 606 and 608 are erected relative to bottom wall 610 to load at least the main compartment of bag 600 with items. After the bag is emptied of its items, bag 600 can be placed in a storage configuration as illustrated in FIG. 7G. In this configuration, front wall 602, back wall 604, side walls 606 and 608 and handles 632 and 634 are collapsed against bottom wall 610 so that bottom wall 610 folds in half and bottom flaps 612 and 614 snap together with a fastener 616. In this way, the side walls are enclosed by bottom wall 610.

Figure 8:
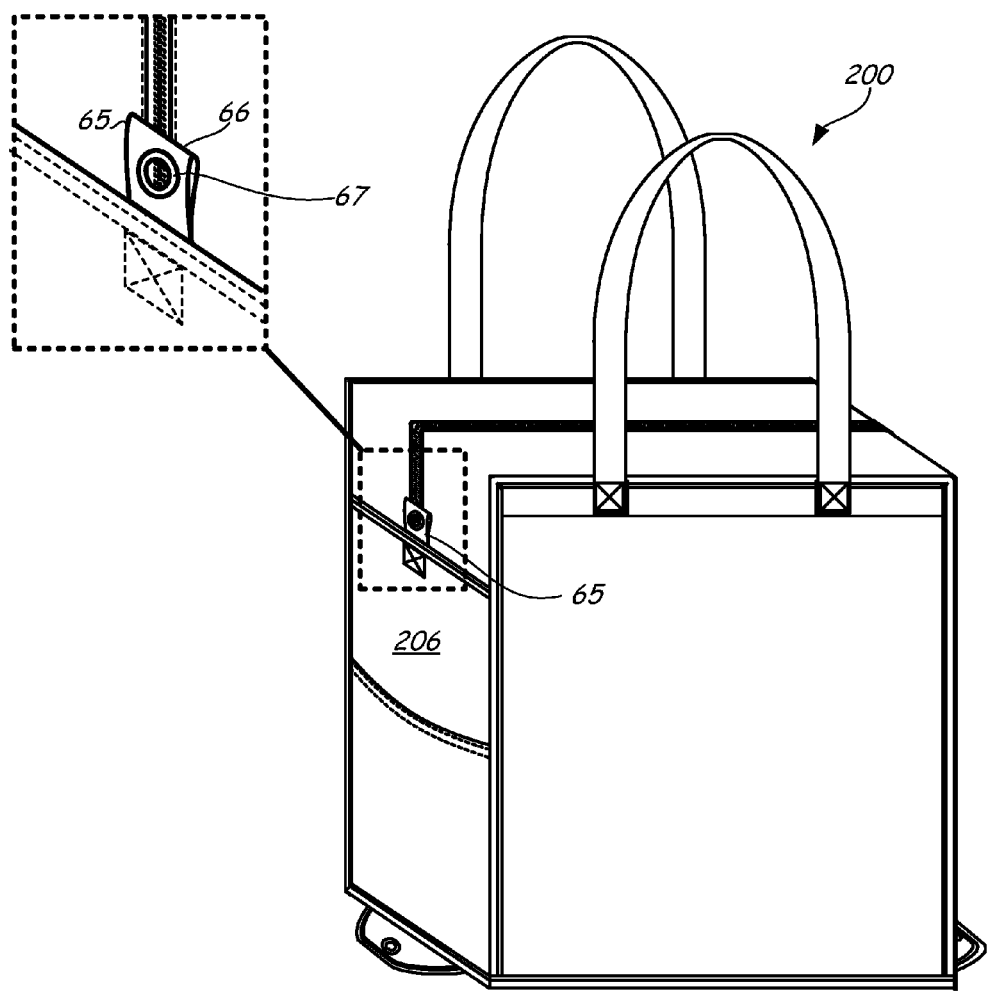
FIG. 8 illustrates a perspective view of the reusable bag illustrated in FIG. 2A including an enlarged view of a carry-strap tab.

FIG. 8 illustrates a perspective view of reusable bag 200 of FIG. 2. In addition to all of the above-described features, reusable bags 200 and 400 also include a tab 65 attached to each of left side wall 206 and 406 and right side wall 208 and 408. Tabs 65 are attached to the left side wall and the right side wall proximate to the upper edge of the left side wall and the right side wall. In regards to bags 200 and 400, the upper edges 246, 446, 247 and 447 of the left and right side walls do not correspond with the top of the bag.

Figure 9:
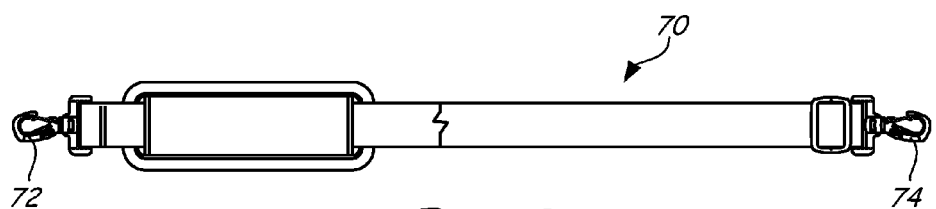
FIG. 9 illustrates a plan view of a carry-strap according to one embodiment.

In one embodiment and as illustrated in FIG. 8, each tab 65 is made of webbing 66 and includes a grommet or o-ring 67. Webbing 66 is attached to the left side wall 206 of bag 200 and grommet 67 is configured to receive a first end 72 of a removable carry strap 70 (illustrated as a plan view in FIG. 9) and the grommet 67 of tab 65, which is attached to the right side wall 208 of the bag, is configured to receive a second end 74 of the removable carry strap 70. It should be realized that tab 65 can take on other forms for coupling to a carry strap. For example, tab 65 can be a loop of material for receiving an end of the carry strap or a D-ring. Carry strap 70 can be different types of carry straps including, but not limited to, a cross-body carry strap for placing around one shoulder and across the torso, a shoulder strap for placing around one shoulder only or a hand strap for carrying by a hand.

Figure 10:
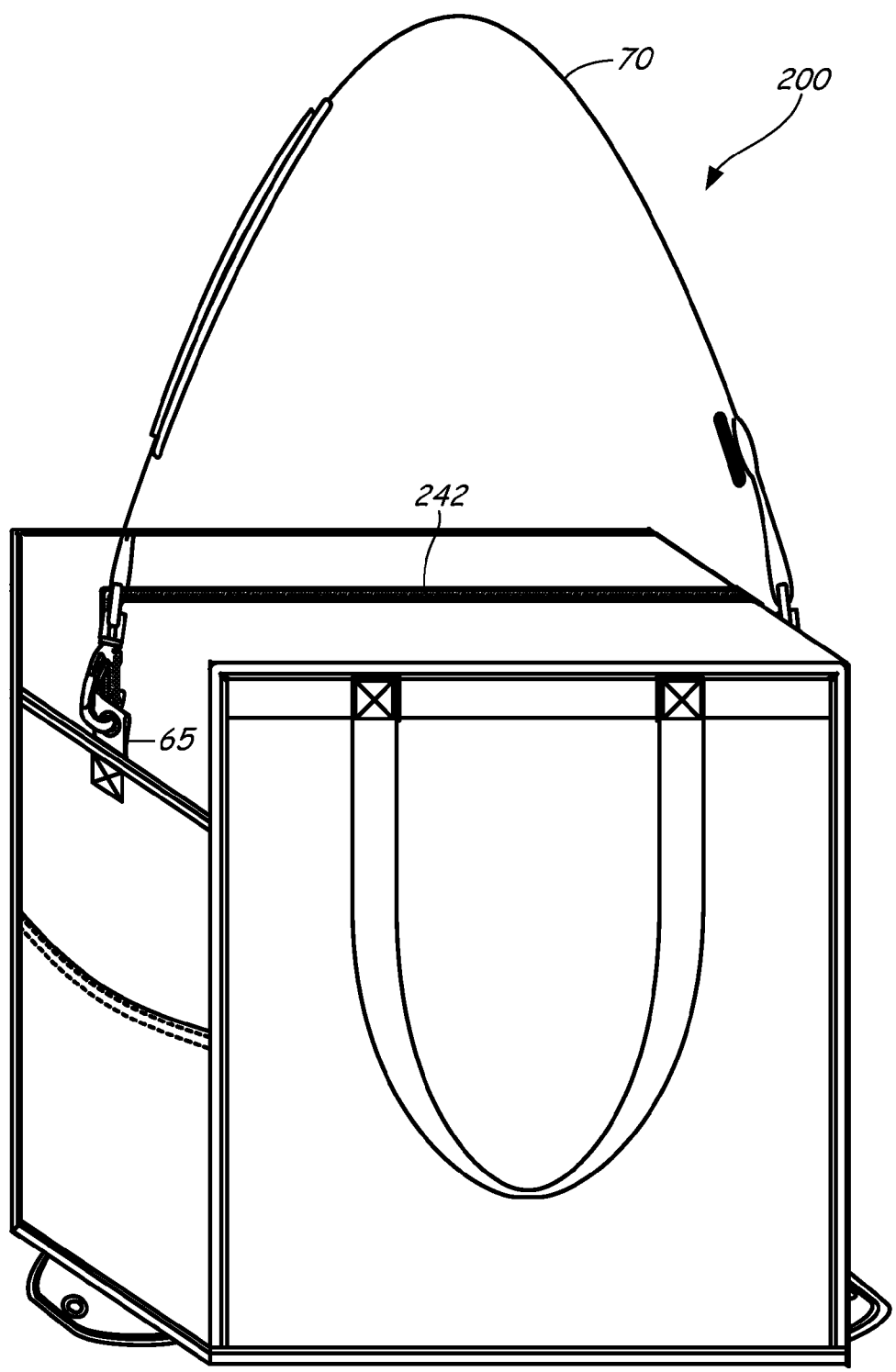
FIG. 10 illustrates a perspective view of the reusable bag illustrated in FIG. 8 including the carry-strap illustrated in FIG. 9 as assembled.

FIG. 10 illustrates a perspective view of reusable bag 200 including carry strap 70 attached to tabs 65. Tabs 65 can also be used for other purposes besides providing a means for attaching a carry strap. In other embodiment, tabs 65 provide a location for a user to grip while pulling the zipper 242 open or closed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A bag comprising:
   a plurality of connected side walls, a bottom wall and an open top and each of the side walls and the bottom wall are made of a single layer of material and have interior surfaces and exterior surfaces, wherein at least the plurality of side walls are collapsible from an erected state into a compact state;
   an interior pocket attached to the interior surface of one of the side walls along a first seam that is stitched across a width of the one side wall and is located on the interior surface of the one side wall, extends through the single layer of material of the one side wall and is visible on the exterior surface of the one side wall, the first seam being positioned at a height from a bottom of the one side wall and spaced apart from the open top by a distance; and
   an exterior pocket attached to the bottom of the exterior surface of the one side wall of the bag by a second seam that is spaced apart from the first seam and located below the first seam, the exterior pocket having a top edge extending across the width of the one side wall and being located a height from the bottom of the one side wall;
   wherein the height of the top edge of the exterior pocket is greater than the height of the first seam of the interior pocket so that the exterior pocket hides the first seam that is visible from an exterior of the one of the side walls of the bag; and
   wherein a distance between a bottom of the interior pocket and the open top is less than a distance between a bottom of the exterior pocket and the open top.

2. The bag of claim 1, wherein the one side wall that the interior and exterior pockets are attached to comprises a side wall that opposes another of the side walls, each opposing side wall having top edges located at substantially similar heights, and wherein the heights of the top edges of the opposing side walls are less than a height of the bag.

3. The bag of claim 2, wherein each of the opposing side walls comprises a tab that provides an attachment component for receiving an end of a carry strap.

4. The bag of claim 1, further comprising an open top that is cinched shut with a bag drawstring partially enclosed within at least one drawstring channel, one of the drawstring channels being attached to the interior surface of the wall with a bag channel seam and being proximate a top edge of the bag.

5. The bag of claim 4, further comprising a stuff sack including a top edge, a bottom edge and a sack drawstring partially enclosed within a sack drawstring channel, the bottom edge of the stuff sack being attached to the interior surface of the wall along the bag channel seam.

6. The bag of claim 1, further comprising a front wall and a back wall, wherein attached to an outer surface of the front wall is a primary handle and attached to an outer surface of the back wall is a primary handle that is substantially similar to the primary handle attached to the outer surface of the front wall, wherein attached to the outer surface of the front wall is a secondary handle and attached to the outer surface of the back wall is a secondary handle that is substantially similar to the secondary handle attached to the outer surface of the front wall, each secondary handle including attachment points that are located between attachments points of one of the primary handles.

7. The bag of claim 1, wherein the wall that the interior and exterior pockets are attached to comprises a side wall that opposes another side wall and wherein the bag further comprises a pair of exterior through channels having first open ends and second open ends, wherein one of the pair of exterior through channels is attached to the exterior surface of the wall and the other of the pair of exterior through channels is attached to an outer facing surface of the opposing side wall.

8. The bag of claim 1, wherein a depth of the interior pocket is substantially similar to a depth of the exterior pocket for ease of a user to reach their arm or hand into for accessing items stored in the interior pocket and the exterior pocket.

9. A bag comprising:
a bottom, a top, a front, a back, a first side and a second side;
an exterior compartment attached to an outside of the first side of the bag and including a top edge, a bottom edge and first and second side edges, the top edge of the exterior compartment extending across a width of the first side of the bag and forming a free end, the bottom edge of the exterior compartment extending across the width of the first side of the bag and being attached at a first location to where the first side of the bag couples to the bottom of the bag to form a fixed end, the first side of the exterior compartment being attached to where the first side of the bag couples to the back of the bag to form a fixed end and the second side of the exterior compartment being attached to where the first side of the bag couples to the front of the bag to form a fixed end; and
an interior compartment attached to an inside of the first side of the bag and including a top edge, a bottom edge and first and second side edges, the top edge of the interior compartment extending across a width of the first side of the bag and forming a free end, the bottom edge of the interior compartment extending across the width of the first side of the bag and being attached to the first side of the bag by a seam that extends through an entire thickness of the first side of the bag to form a fixed end, the first side of the interior compartment being attached to where the first side of the bag couples to the back of the bag to form a fixed end and the second side of the interior compartment being attached to where the first side of the bag couples to the front of the bag to form a fixed end; and
wherein the seam of the interior compartment is spaced apart from the top of the bag by a distance and is spaced apart from the bottom of the bag;
wherein the first location where the exterior compartment is attached to the first side of the bag is spaced apart from and located below the seam of the interior compartment;
wherein the top edge of the exterior compartment is located above the seam that attaches the bottom edge of the interior compartment so as to hide the seam on an exterior of the bag.

10. The bag of claim 9, wherein the first side and the second side of the bag have top edges located at substantially similar heights and wherein the heights of the top edges of the first side and the second side are less than a height of the bag.

11. The bag of claim 10, further comprising a tab coupled to each of the top edges of the first side and the second side of the bag, each tab providing an attachment component for receiving an end of a carry strap.

12. The bag of claim 9, wherein the front, the back, the first side and the second side define an upper edge of the bag, wherein a cord extends along the front, the back, the first side and the second side of the bag proximate to the upper edge of the bag to cinch the upper edges of the bag together, the cord being partially enclosed within at least one sleeve that is attached to an interior of the bag by a sleeve seam.

13. The bag of claim 12, further comprising a stuff sack including a closed end and an open end, the closed end of the stuff sack being attached to the interior of the bag along the sleeve seam of the at least one sleeve.

14. The bag of claim 13, wherein the open end of the stuff sack is positioned within the interior compartment of the bag.

15. The bag of claim 9, wherein two of the front, the back, the first side, the second side and the bottom of the bag comprise a single panel of material.

16. A bag comprising:
a front wall and an opposing back wall, a first side wall and an opposing second side wall, an open top and a bottom wall coupling the front wall to the back wall and the first side wall to the opposing second side wall to form a main compartment, wherein each of the front wall, the back wall, the first side wall, the second side wall and the bottom wall are made of a single thickness of material and at least the front wall, the back wall, the first side wall and the second side wall are collapsible from an erected state into a compact state;
an interior pocket attached to the first side wall along a first seam that is stitched across a width of the first side wall and extends through an entirety of the single thickness of material and visible from an exterior of the bag, the first seam being located at a height from a bottom of the first side wall and spaced apart from the open top by a distance; and
an exterior pocket attached to the bottom of the first side wall by a second seam spaced apart from the first seam and located below the first seam and having a top edge extending across the width of the first side wall, wherein the top edge of the exterior pocket is located a height from the bottom of the first side wall that is greater than the height from the bottom of the first side wall of the first seam that attaches the interior pocket to the first side wall;
wherein a distance between a bottom of the interior pocket and the open top is less than a distance between a bottom of the exterior pocket and the open top; and
wherein the top edge of the exterior pocket hides the first seam of the interior pocket from the exterior of the bag.

17. The bag of claim 16, further comprising a pair of exterior through channels each having a first open end and a second open end, wherein one of the pair of exterior through channels is attached to an outer facing surface of the first side wall and the other of the pair of exterior through channels is attached to an outer facing surface of the opposing second side wall.

18. The bag of claim 17, wherein each of the pair of exterior through channels extend a distance from the first open end to the second open end that is less than a width of the first side wall and the opposing second side wall.

19. The bag of claim 9, wherein at least the front, the back, the first side and the second side are collapsible from an erected state into a compact state.

\* \* \* \* \*